(12) United States Patent
Wang et al.

(10) Patent No.: US 11,616,738 B2
(45) Date of Patent: Mar. 28, 2023

(54) PACKET PROCESSING METHOD AND RELATED DEVICE

(71) Applicant: HUAWEI TECHNOLOGIES CO., LTD., Guangdong (CN)

(72) Inventors: Liang Wang, Shenzhen (CN); Xu Zhang, Shanghai (CN); Shui Cao, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 97 days.

(21) Appl. No.: 17/087,087

(22) Filed: Nov. 2, 2020

(65) Prior Publication Data

US 2021/0051118 A1  Feb. 18, 2021

Related U.S. Application Data

(63) Continuation of application No. PCT/CN2019/084285, filed on Apr. 25, 2019.

(30) Foreign Application Priority Data

Aug. 20, 2018  (CN) .......................... 201810949396.2

(51) Int. Cl.
*H04L 12/861* (2013.01)
*H04L 12/883* (2013.01)
(Continued)

(52) U.S. Cl.
CPC ...... *H04L 49/9068* (2013.01); *G06F 12/1081* (2013.01); *G06F 13/1668* (2013.01);
(Continued)

(58) Field of Classification Search
CPC .............. H04L 49/9068; H04L 49/552; H04L 49/9015; G06F 12/1081; G06F 13/1668
(Continued)

(56) References Cited

U.S. PATENT DOCUMENTS 8,306,062 B1   11/2012  Cohen
9,007,941 B1   4/2015  Miclea et al.
(Continued)

FOREIGN PATENT DOCUMENTS

CN   103139253 A   6/2013
CN   104184729 A   12/2014
(Continued)

OTHER PUBLICATIONS

Liu Zhao-hui et al., "A Packet Classification intelligent NIC base on FPGA", Jun. 2013, total:4 pages.

*Primary Examiner* — Faisal Choudhury
(74) *Attorney, Agent, or Firm* — Womble Bond Dickinson (US) LLP

(57) ABSTRACT

A packet processing method and device are provided, to save CPU resources consumed by parsing a packet. The method includes: parsing, by an intelligent network interface card, a received first packet to obtain an identifier of the first packet; updating, by the intelligent network interface card, a control field of a first memory buffer based on the identifier of the first packet; storing, by the intelligent network interface card, a payload of the first packet or a packet header and a payload of the first packet into the first address space through DMA based on an aggregation position of the first packet; aggregating, by a host, the first address information and at least one piece of second address information based on an updated control field in the first mbuf; and reading, by a virtual machine, address information, to obtain data in an address space indicated by the address information.

13 Claims, 13 Drawing Sheets

(51) Int. Cl.
    *H04L 49/90* (2022.01)
    *G06F 12/1081* (2016.01)
    *G06F 13/16* (2006.01)
    *H04L 49/552* (2022.01)
    *H04L 49/9015* (2022.01)
    *H04L 49/00* (2022.01)

(52) U.S. Cl.
    CPC ........ *H04L 49/552* (2013.01); *H04L 49/9015* (2013.01); *G06F 2212/621* (2013.01); *G06F 2213/28* (2013.01); *H04L 49/3045* (2013.01)

(58) Field of Classification Search
    USPC ........................................................ 370/389
    See application file for complete search history.

(56) References Cited

U.S. PATENT DOCUMENTS

| | | | |
|---|---|---|---|
| 9,350,825 | B2 | 5/2016 | Cardona et al. |
| 9,742,682 | B2 | 8/2017 | Jain et al. |
| 9,948,579 | B1 | 4/2018 | Sivaramakrishnan |
| 10,263,832 | B1* | 4/2019 | Ghosh ................ H04L 43/0823 |
| 2006/0173970 | A1* | 8/2006 | Pope ........................ G06F 13/28 |
| | | | 709/216 |
| 2013/0177019 | A1 | 7/2013 | Zhang |
| 2014/0214915 | A1 | 7/2014 | Dragon et al. |
| 2015/0370586 | A1 | 12/2015 | Cooper et al. |
| 2019/0081904 | A1* | 3/2019 | Bohrer .................... H04L 47/20 |

FOREIGN PATENT DOCUMENTS

| | | |
|---|---|---|
| CN | 104469845 A | 3/2015 |
| CN | 104471553 A | 3/2015 |
| CN | 105282135 A | 1/2016 |
| CN | 105471754 A | 4/2016 |
| CN | 106445628 A | 2/2017 |
| CN | 106921578 A | 7/2017 |
| CN | 106921665 A | 7/2017 |
| CN | 107257329 A | 10/2017 |
| CN | 107872332 A | 4/2018 |
| EP | 3086520 A2 | 10/2016 |

* cited by examiner

PACKET PROCESSING METHOD AND RELATED DEVICE

CROSS-REFERENCE TO RELATED APPLICATIONS

This application is a continuation of International Patent Application No. PCT/CN2019/084285 filed on Apr. 25, 2019, which claims priority to Chinese Patent Application No. 201810949396.2 filed on Aug. 20, 2018. The disclosures of the aforementioned applications are herein incorporated by reference in their entireties.

TECHNICAL FIELD

This application relates to the field of data transmission, and in particular, to a packet processing method and a related device.

BACKGROUND

Before a data packet can be received by an application program, the data packet needs to be processed by various layers such as a data link layer, a network layer, a transport layer, an application layer. During transmission, a longer packet is used to effectively reduce central processing unit (CPU) usage of an end node and increase a bandwidth. However, when a packet is transmitted on a physical link, the packet needs to meet a length requirement of an MTU (maximum transmission unit) of the link. Therefore, on a transmit side, before the packet enters a physical network, the packet needs to be divided into packets that meet the MTU length requirement. On a receive side, before the packets that meet the MTU length requirement enter a host protocol stack, the packets are aggregated into a large packet, for being processed by the protocol stack.

In a prior art, packets are aggregated through copying by using software. A network adapter driver receives a packet from network adapter hardware, parses a packet header of each packet to find 5-tuple information of the packet, and uniquely determines a data flow based on the linked 5-tuple information. Data packets belonging to a same data flow are cached in a same data structure linked list. Except for a node head of the linked list, a packet header is not required at a start address in each subsequent data structure. After determining that an aggregation condition is met, the network adapter driver updates a packet length in the packet header, and then copies the plurality of packets in the data structure linked list to an address space of a virtual machine.

In the prior-art packet aggregation manner, software needs to be used to parse each packet received from the network adapter hardware to extract the 5-tuple information. Consequently a large quantity of CPU resources are consumed.

SUMMARY

Embodiments of this application provide a packet processing method, to save CPU resources consumed by parsing a packet. The embodiments of this application further provide a corresponding apparatus.

According to a first aspect, an embodiment of this application provides a physical machine. The physical machine may include an intelligent network interface card, a processor, and a memory. The host and the virtual machine may run on the physical machine by running code in the memory. After receiving a first packet from an external network or a local guest virtual machine, the intelligent network interface card may parse the first packet to obtain an identifier of the first packet. The identifier of the first packet may include an identifier of a data flow to which the first packet belongs and a sequence number of the first packet. After obtaining the identifier of the first packet, the intelligent network interface card may obtain a first memory buffer mbuf corresponding to the first packet. Because the intelligent network interface card may record reception and aggregation information of a plurality of first packets belonging to a same data flow, the intelligent network interface card may determine, based on the identifier of the data flow to which the first packet belongs, the data flow corresponding to the first packet, and update a control field of the first mbuf with reference to the reception and aggregation information that is of the first packet and that is recorded in the intelligent network interface card. The first mbuf may further include first address information allocated to the first packet, and the first address information indicates a first address space in the virtual machine. The intelligent network interface card may obtain an aggregation position of the first packet based on the identifier of the first packet; and store a payload of the first packet or store a packet header and a payload of the first packet into the first address space through direct memory access (DMA) based on the aggregation position of the first packet, where the aggregation position is a position of the first address information relative to at least one piece of second address information when the first address information and the at least one piece of second address information are aggregated, the second address information indicates a second address space that is in the virtual machine and that is allocated to a second packet, and the second packet is a packet that is received by the intelligent network interface card and that belongs to a same data flow as the first packet. The host may learn of an aggregation position of the first address information based on an updated control field in the first mbuf, to aggregate the first address information included in the first mbuf with second address information included in at least one second mbuf. The first address information and the second address information each may be a descriptor identifier. When an aggregation termination condition is met, the host may write address information obtained through aggregation into a used vring, and send a notification to the virtual machine, where the notification is used to indicate the virtual machine to read the address information obtained through aggregation. The virtual machine may read, based on the notification, the address information obtained through aggregation from the used vring, to obtain data in an address space indicated by the address information obtained through aggregation.

In this application, the intelligent network interface card parses the received first packet to obtain the identifier of the first packet; fills in, based on the identifier of the first packet, the control field of the first memory buffer; and stores, through DMA, the payload of the first packet or the packet header and the payload of the first packet into the buffer space indicated by the first address information. The host may aggregate the first address information with the at least one piece of second address information based on the updated control field in the first mbuf. The virtual machine reads, based on the address information obtained through aggregation, content included in the address space indicated by the address information obtained through aggregation. In this solution, the intelligent network interface card parses the first packet, so that CPU resources consumed for parsing the first packet are saved. In addition, the intelligent network interface card stores, through DMA, the first packet into the first address space indicated by the first address information, so that the virtual machine can directly read the packet from the first address space. This prevents software from copying the first packet in a mobile manner from an original position to a target position, and saves CPU resources consumed when the software copies the first packet in the mobile manner.

In an embodiment, the control field in the first mbuf includes a first flag, and the first flag is used to identify whether the first packet carries the packet header. The intelligent network interface card may record the reception and aggregation information of the plurality of first packets belonging to the same data flow. The intelligent network interface card obtains the identifier of the first packet by parsing the first packet. Because the identifier of the first packet includes the identifier of the data flow to which the first packet belongs and the packet sequence number, the identifier of the data flow to which the first packet belongs may be 5-tuple information and a subnet identifier that are carried in the first packet, and the packet sequence number is used to identify an order of the first packet in the data flow. Therefore, the intelligent network interface card may determine, based on the identifier of the data flow to which the first packet belongs and the packet sequence number of the first packet, the data flow to which the first packet belongs and a sequence position of the first packet in the data flow; and then combine the receiving and aggregation information that is of the first packet and that is recorded in the intelligent network interface card, to obtain the aggregation position of the first packet with reference to the reception and aggregation information of the first packet recorded in the intelligent network interface card. If the aggregation position of the first packet is an initial position, the intelligent network interface card may add first indication information to a first flag of the control field, where the first indication information is used by the host to learn that the aggregation position of the first address information is the initial position. When the aggregation position of the first packet is the initial position, the intelligent network interface card stores the packet header and the payload of the first packet into the first address space through DMA.

In this application, the intelligent network interface card obtains the aggregation position of the first packet based on the identifier of the first packet. When the aggregation position of the first packet is the initial position, the intelligent network interface card adds the first indication information to the first flag; and stores, through DMA, the first packet into the buffer space indicated by the first address information. In this way, the packet header is also retained in a larger packet obtained through aggregation, to ensure that a packet header of a packet obtained after aggregation is consistent with a packet header of a corresponding to-be-aggregated packet.

In an embodiment, when the first mbuf is updated, the host may read the control field of the first mbuf. If the first indication information exists in the first flag, the host determines that the aggregation position of the first address information included in the first mbuf is the initial position, and the host places, into a header of a mbuf linked list, the first mbuf that includes the first address information, so that the header of the mbuf linked list is aggregated with the at least one second mbuf that includes the second address information, to generate the mbuf linked list.

In this application, when the first indication information exists in the first flag, and it is determined that the aggregation position of the first address information is the initial position, the first mbuf corresponding to the first packet is placed into the header of the mbuf linked list, so that a format of a larger packet obtained after a plurality of second packets are aggregated is consistent with a format of the first packet received by the intelligent network interface card. This ensures data integrity and improves implementability of this solution.

In an embodiment, the intelligent network interface card may prestore length information of a virtual input/output virtio protocol header. If the intelligent network interface card learns, based on the identifier of the first packet, that the aggregation position of the first packet is the initial position, before the intelligent network interface card stores the packet header and the payload of the first packet into the first address space through DMA, the intelligent network interface card may reserve a third address space at a start position of the first address space, where a length of the third address space is a length of the virtual input/output virtio protocol header. When the host determines, based on the updated control field in the first mbuf, that the aggregation termination condition is met, the host may write the virtio protocol header into the third address space.

In this application, because this application is executed based on a virtio protocol, when the aggregation position of the first packet is the initial position, the length of the virtio protocol header is reserved at the start position of the first address space indicated by the first address information. Therefore, when the aggregation termination condition is met, the host may write the virtio protocol header into the reserved position. This improves implementability of this solution.

In an embodiment, the control field in the first mbuf further includes a second flag and a sequence number field, and the second flag may be used to identify whether the sequence number field in the control field is valid. The intelligent network interface card may obtain the aggregation position of the first packet based on the identifier of the data flow to which the first packet belongs and the packet sequence number of the first packet. If the aggregation position of the first packet is not the initial position, the intelligent network interface card may add the second indication information to the second flag, and the second indication information is used to indicate that the sequence number field included in the control field of the first mbuf is valid. Because the identifier of the first packet includes the packet sequence number, the intelligent network interface card may fill in a sequence number field of the control field of the first mbuf based on the packet sequence number carried in the first packet, where the sequence number field is used by the host to obtain an aggregation position of the first address information. When the aggregation position of the first packet is not the initial position, the intelligent network interface card stores the packet header and the payload of the first packet into the first address space through DMA.

In this application, when the aggregation position of the first packet is not the initial position, the intelligent network interface card fills in the sequence number field of the control field of the first mbuf, so that the virtual host may directly sort a plurality of second mbufs based on the first sequence number when a virtual host aggregates the first address information with a plurality of pieces of second address information. This improves efficiency of packet aggregation.

In an embodiment, the intelligent network card may store a correspondence table, the correspondence table includes a plurality of entries, each of the plurality of entries corresponds to one data flow, and each entry may include an identifier of a data flow to which a packet belongs and a mapping relationship between a sequence number of the packet and a number of the packet. The number of the packet is used to indicate an aggregation position of the packet. After the intelligent network card obtains the identifier that is of the data flow to which the first packet belongs and that is included in the identifier that is of the first packet and that is obtained by the intelligent network interface card by parsing the first packet, the intelligent network interface card may first traverse the correspondence table based on the identifier of the data flow to which the first packet belongs, to find a target entry corresponding to the first packet, and then read the number of the first packet from the target entry based on the packet sequence number of the first packet and the mapping relationship that is between the sequence number of the first packet and the number of the first packet and that is included in the target entry. When the number of the first packet is a preset value, the intelligent network interface card may determine that the aggregation position of the first packet is the initial position. When the number of the first packet is not a preset value, the intelligent network interface card may determine that the aggregation position of the first packet is not the initial position.

In this application, the intelligent network card stores the correspondence table in which a reception status of the first packet of the data flow is recorded, and the correspondence table includes a plurality of entries. After the target entry corresponding to the first packet is determined, whether the aggregation position of the first packet is the initial position is determined in a manner of determining whether the number of the first packet in the target entry is the preset value, and the reception status of the first packet is recorded based on the correspondence table. This can be easily operated and implemented, thereby improving implementability of this solution.

In an embodiment, because the control field of the first mbuf may further include a sequence number field, after finding the number of the first packet in the correspondence table based on the identifier of the first packet, the intelligent network interface card may write the number of the first packet into the sequence number field.

In this application, the number of the first packet is directly written into the sequence number field of the first mbuf. In other words, the intelligent network interface card and the virtual host use same sorting logic for the first packet. This ensures smoothness of packet aggregation and improves efficiency of packet aggregation.

In an embodiment, after determining, based on the identifier of the first packet and the correspondence table, that the number of the first packet is found, the intelligent network interface card may increase the number of the first packet stored in the correspondence table by 1, to obtain a number obtained by increasing the number of the first packet by 1. When the number obtained by increasing the number of the first packet by 1 exceeds a first preset threshold, the intelligent network interface card may update the number obtained by increasing the number of the first packet by 1 to the preset value. The first preset threshold may be a quantity of a plurality of included second packets when the aggregation termination condition is met. The preset value is a number that is of the first packet and that is recorded in the correspondence table when the aggregation position of the first packet is the initial position.

In this application, when the aggregation position of the first packet received by the intelligent network interface card is not the initial position, the number of the first packet is increased by 1. When a second sequence number obtained by increasing the number of the first packet by 1 reaches the first preset threshold, that is, when a quantity of a plurality of to-be-aggregated second packets reaches the aggregation termination condition, the sequence number obtained by increasing the number of the first packet by 1 is updated to the preset value. In this way, when the intelligent network interface card receives a first packet next time, the intelligent network interface card may learn, based on the number of the first packet, that the aggregation position of the first packet is the initial position. This improves implementation flexibility of this solution.

In an embodiment, because a plurality of entries included in the correspondence table each store an identifier of a data flow in which each packet is located, and the identifier of the data flow to which the packet belongs may be 5-tuple information and a subnet identifier of the packet. After obtaining the 5-tuple information and the subnet identifier that are included in the identifier of the first packet, the intelligent network interface card traverses the plurality of entries included in the foregoing correspondence table. When there is no target entry corresponding to the first packet in the plurality of entries, the intelligent network interface card may generate, based on the 5-tuple information and the subnet identifier of the first packet, the identifier of the data flow to which the first packet belongs; add the generated identifier of the data flow to which the first packet belongs to the correspondence table, to generate the target entry corresponding to the first packet; generate the number of the first packet based on a packet sequence number of the first packet; and store the number of the first packet in the target entry. When there is the target entry corresponding to the first packet in the plurality of entries, the intelligent network interface card reads the target entry in which the identifier of the data flow is located, to obtain the number of the first packet based on the packet sequence number of the first packet.

In this application, after obtaining the 5-tuple information and the subnet identifier of the first packet, the intelligent network interface card determines whether there is a target entry corresponding to the first packet in the correspondence table; and if there is no target entry, the intelligent network interface card generates a new target entry; or if there is a target entry, the intelligent network interface card reads the target entry. This ensures that each data flow received by the intelligent network interface card is recorded in the correspondence table, and ensures integrity of data in the correspondence table.

In an embodiment, each of the plurality of entries included in the correspondence table further includes a last update time point. The intelligent network interface card may preset a second preset threshold for a quantity of entries in the correspondence table, and the intelligent network interface card may learn of the quantity of the plurality of entries. When the quantity of the plurality of entries reaches the second preset threshold, the intelligent network interface card may obtain a last update time point included in each of the plurality of entries, to generate a difference between the last update time point of each of the plurality of entries and a current time point. The intelligent network interface card may determine whether there is an entry whose difference between a last update time and the current time point exceeds a third preset threshold, where the third preset threshold may be different when a target data flow to which the first packet belongs is in different states. If there is an entry whose difference between a last update time and the current time point exceeds the third preset threshold, the intelligent network interface card may delete the entry whose difference between the last update time and the current time point exceeds the third preset threshold.

In this application, the intelligent network interface card presets a threshold for a quantity of entries in the correspondence table. When the preset threshold is reached, the intelligent network interface card determines the difference between the last update time point of each entry and the current time point. If there is an entry whose difference between a last update time and the current time point exceeds the third preset threshold, the intelligent network interface card deletes the entry whose difference between the last update time and the current time point exceeds the third preset threshold. This ensures that the target data flow corresponding to the entry stored in the correspondence table is in an active packet transmission state, thereby improving usage of each entry in the correspondence table.

In an embodiment, each mbuf linked list corresponds to one data flow, the control field in the first mbuf further includes an identifier of the mbuf linked list, and the identifier of the mbuf linked list may be consistent with the identifier of the data flow to which the packet belongs, or may be generated by the intelligent network interface card based on a mapping relationship between the identifier of the mbuf linked list and the identifier of the data flow to which the packet belongs. Therefore, after reading the first mbuf, the host may obtain, based on the identifier of the mbuf linked list included in the control field of the first mbuf, the mbuf linked list corresponding to the first mbuf; and aggregate the first mbuf that includes the first address information with the at least one second mbuf included in the mbuf linked list, where the second mbuf includes the second address information.

In this application, the control field of the mbuf includes the identifier of the data flow, and each mbuf linked list corresponds to one data flow, so that smoothness of packet aggregation is increased and feasibility of this solution is improved.

In an embodiment, the host further stores a third mbuf, and a control field of the third mbuf further includes a third flag. The intelligent network interface card may further parse a received third packet to obtain information carried in the third packet, where the information carried in the third packet indicates that the third packet is a packet that does not need to be aggregated. Because the third packet is the packet that does not need to be aggregated, the intelligent network interface card may add third indication information to the third flag of the control field of the third mbuf, where the third indication information is used to indicate that the third packet needs to be immediately sent. The third mbuf further includes third address information allocated to the third packet, where the third address information indicates a fourth address space in the virtual machine. Because the third packet does not need to be aggregated, after the intelligent network interface card reserves, at a start position of the fourth address space indicated by the third address information, an address space with a virtio protocol header length, the intelligent network interface card may store the packet header and the payload of the first packet into the fourth address space through DMA. After reading an updated third mbuf, the host may learn that the third packet is the packet that does not need to be aggregated and needs to be immediately sent, so that the host sends a notification to the virtual machine. After receiving the notification, the virtual machine reads the third address information based on the notification, to obtain the third packet stored in the fourth address space.

In this application, the intelligent network interface card not only can process packets that need to be aggregated, but also can process a packet that is directly sent to the virtual machine. This increases an implementation scenario of this solution and improves implementation flexibility of this solution.

According to a second aspect, an embodiment of this application provides a packet processing method. The packet processing method is applied to an intelligent network interface card. The intelligent network interface card runs on a physical machine, and a host and a virtual machine further run on the physical machine. The packet processing method performed by the intelligent network interface card is the method performed by the intelligent network interface card in the first aspect. The method may include: parsing a received first packet to obtain an identifier of the first packet; updating a control field of a first memory buffer mbuf based on the identifier of the first packet, where the first mbuf further includes first address information allocated to the first packet, and the first address information indicates a first address space in the virtual machine; storing a payload of the first packet or storing a packet header and a payload of the first packet into the first address space through DMA based on an aggregation position of the first packet, where the aggregation position is a position of the first address information relative to at least one piece of second address information when the first address information and the at least one piece of second address information are aggregated, the second address information indicates a second address space that is in the virtual machine and that is allocated to a second packet, and the second packet is a packet that is received by the intelligent network interface card and that belongs to a same data flow as the first packet; where an updated control field in the first mbuf is used to indicate the host to aggregate the first address information with the at least one piece of second address information.

In this application, the intelligent network interface card parses the received first packet to obtain the identifier of the first packet; fills in, based on the identifier of the first packet, the control field of the first memory buffer; and stores, through DMA, the payload of the first packet or the packet header and the payload of the first packet into the buffer space indicated by the first address information, where the updated control field in the first mbuf may indicate the host to aggregate the first address information with the at least one piece of second address information. In this solution, the intelligent network interface card parses the first packet, so that CPU resources consumed for parsing the first packet are saved. In addition, the intelligent network interface card stores, through DMA, the first packet into the first address space indicated by the first address information, so that the virtual machine can directly read the packet from the first address space. This prevents software from copying the first packet in a mobile manner from an original position to a target position, and saves CPU resources consumed when the software copies the first packet in the mobile manner.

According to a third aspect, an embodiment of this application provides a packet processing method. The packet processing method is performed by a host and a virtual machine cooperatively. The host and the virtual machine run on a physical machine, and the physical machine further includes an intelligent network interface card. The packet processing method performed by the host and the virtual machine is the method performed by the host and the virtual machine in the first aspect. The method may include: reading, by the host, a control field of a first mbuf, to determine an aggregation position of a first packet corresponding to the first mbuf, where the control field of the first mbuf is updated by the intelligent network interface card based on an identifier of the first packet; aggregating, by the host, first address information in the first mbuf with at least one piece of second address information based on the aggregation position of the first packet, where the aggregation position is a position of the first address information relative to at least one piece of second address information when the first address information and the at least one piece of second address information are aggregated, the first address information indicates a first address space that is in the virtual machine and that is allocated to the first packet, the second address information indicates a second address space that is in the virtual machine and that is allocated to a second packet, and the second packet is a packet that belongs to a same data flow as the first packet; and obtaining, by the virtual machine through DMA based on address information obtained through aggregation, data in an address space indicated by the address information obtained through aggregation, where the data in the address space includes a payload of the first packet and a payload of the at least one second packet.

In this application, the host determines the aggregation position of the first packet based on the control field that is in the first mbuf and that is updated by the intelligent network interface card, and aggregates the first address information with the at least one piece of second address information. Then, the virtual machine obtains, through DMA based on the address information obtained through aggregation, the data in the address space indicated by the address information obtained through aggregation. In this solution, the host can obtain the aggregation position of the first packet with no need to parse the first packet. In addition, the virtual machine can directly read, through direct memory access, the packet from the address space indicated by the address information obtained through aggregation. This prevents software from copying the first packet in a mobile manner from an original position to a target position, and saves CPU resources consumed when the software copies the first packet in the mobile manner.

According to a fourth aspect, an embodiment of this application provides an intelligent network interface card. The intelligent network interface card runs on a physical machine, a host and a virtual machine further run on the physical machine. The intelligent network interface card performs the method performed by the intelligent network interface card in the first aspect. The intelligent network interface card includes: a parsing unit, configured to parse a received first packet to obtain an identifier of the first packet; an updating unit, configured to update a control field of a first memory buffer mbuf based on the identifier of the first packet, where the first mbuf further includes first address information allocated to the first packet, and the first address information indicates a first address space in the virtual machine; and a storage unit, configured to store a payload of the first packet or store a packet header and a payload of the first packet into the first address space through DMA based on an aggregation position of the first packet, where the aggregation position is a position of the first address information relative to at least one piece of second address information when the first address information and the at least one piece of second address information are aggregated, the second address information indicates a second address space that is in the virtual machine and that is allocated to a second packet, and the second packet is a packet that is received by the intelligent network interface card and that belongs to a same data flow as the first packet; where an updated control field in the first mbuf is used to indicate the host to aggregate the first address information with the at least one piece of second address information.

In this application, the parsing unit parses the received first packet to obtain the identifier of the first packet; the updating unit fills in, based on the identifier of the first packet, the control field of the first memory buffer; and the storage unit stores, through DMA, the payload of the first packet or the packet header and the payload of the first packet into the buffer space indicated by the first address information, where the updated control field in the first mbuf may indicate the host to aggregate the first address information with the at least one piece of second address information. In this solution, the intelligent network interface card parses the first packet, so that CPU resources consumed for parsing the first packet are saved. In addition, the intelligent network interface card stores, through DMA, the first packet into the first address space indicated by the first address information, so that the virtual machine can directly read the packet from the first address space. This prevents software from copying the first packet in a mobile manner from an original position to a target position, and saves CPU resources consumed when the software copies the first packet in the mobile manner.

According to a fifth aspect, an embodiment of this application provides a packet processing apparatus. The packet processing apparatus includes a host and a virtual machine, the apparatus runs on a physical machine, and the physical machine further includes an intelligent network interface card. The host and the virtual machine perform the method performed by the host and the virtual machine in the first aspect. The host is configured to read a control field of a first mbuf, to determine an aggregation position of a first packet corresponding to the first mbuf, where the control field of the first mbuf is updated by the intelligent network interface card based on an identifier of the first packet; the host is further configured to aggregate first address information in the first mbuf with at least one piece of second address information based on the aggregation position of the first packet, where the aggregation position is a position of the first address information relative to at least one piece of second address information when the first address information and the at least one piece of second address information are aggregated, the first address information indicates a first address space that is in the virtual machine and that is allocated to the first packet, the second address information indicates a second address space that is in the virtual machine and that is allocated to a second packet, and the second packet is a packet that belongs to a same data flow as the first packet; and the virtual machine is configured to obtain, through DMA based on address information obtained through aggregation, data in an address space indicated by the address information obtained through aggregation, where the data in the address space includes a payload of the first packet and a payload of the at least one second packet.

In this application, the host determines the aggregation position of the first packet based on the control field that is in the first mbuf and that is updated by the intelligent network interface card, and aggregates the first address information with the at least one piece of second address information. Then, the virtual machine obtains, through DMA based on the address information obtained through aggregation, the data in the address space indicated by the address information obtained through aggregation. In this solution, the host can obtain the aggregation position of the first packet with no need to parse the first packet. In addition, the virtual machine can directly read, through direct memory access, the packet from the address space indicated by the address information obtained through aggregation. This prevents software from copying the first packet in a mobile manner from an original position to a target position, and saves CPU resources consumed when the software copies the first packet in the mobile manner.

According to a sixth aspect, an embodiment of this application provides an intelligent network interface card. The intelligent network interface card includes a processing circuit and a memory, and the memory stores a packet processing instruction described in the second aspect. The processing circuit is configured to execute the packet processing instruction stored in the memory, to perform the operations of the packet processing method in the second aspect.

According to a seventh aspect, an embodiment of this application provides a computer-readable storage medium. The computer-readable storage medium stores a packet processing instruction, and when the instruction is run on a computer, the computer is enabled to perform the packet processing method in the second aspect.

According to an eighth aspect, an embodiment of this application provides a computer-readable storage medium. The computer-readable storage medium stores a packet processing instruction, and when the instruction is run on a computer, the computer is enabled to perform the packet processing method in the third aspect.

According to a ninth aspect, an embodiment of this application provides a chip system. The chip system includes a processor, configured to support the packet processing apparatus in implementing functions in the foregoing aspects, for example, sending or processing data and/or information in the foregoing methods. In an embodiment, the chip system further includes a memory, where the memory is configured to store a necessary program instruction and necessary data of the packet processing apparatus. The chip system may include a chip, or may include a chip and another discrete component.

For beneficial effects of the sixth aspect to the ninth aspect of this application, refer to the first aspect.

DESCRIPTION OF EMBODIMENTS

The embodiments of this application provide a packet processing method, to save CPU resources consumed by parsing a packet. The embodiments of this application further provide a corresponding apparatus. Detailed descriptions are provided below.

Figure 1:
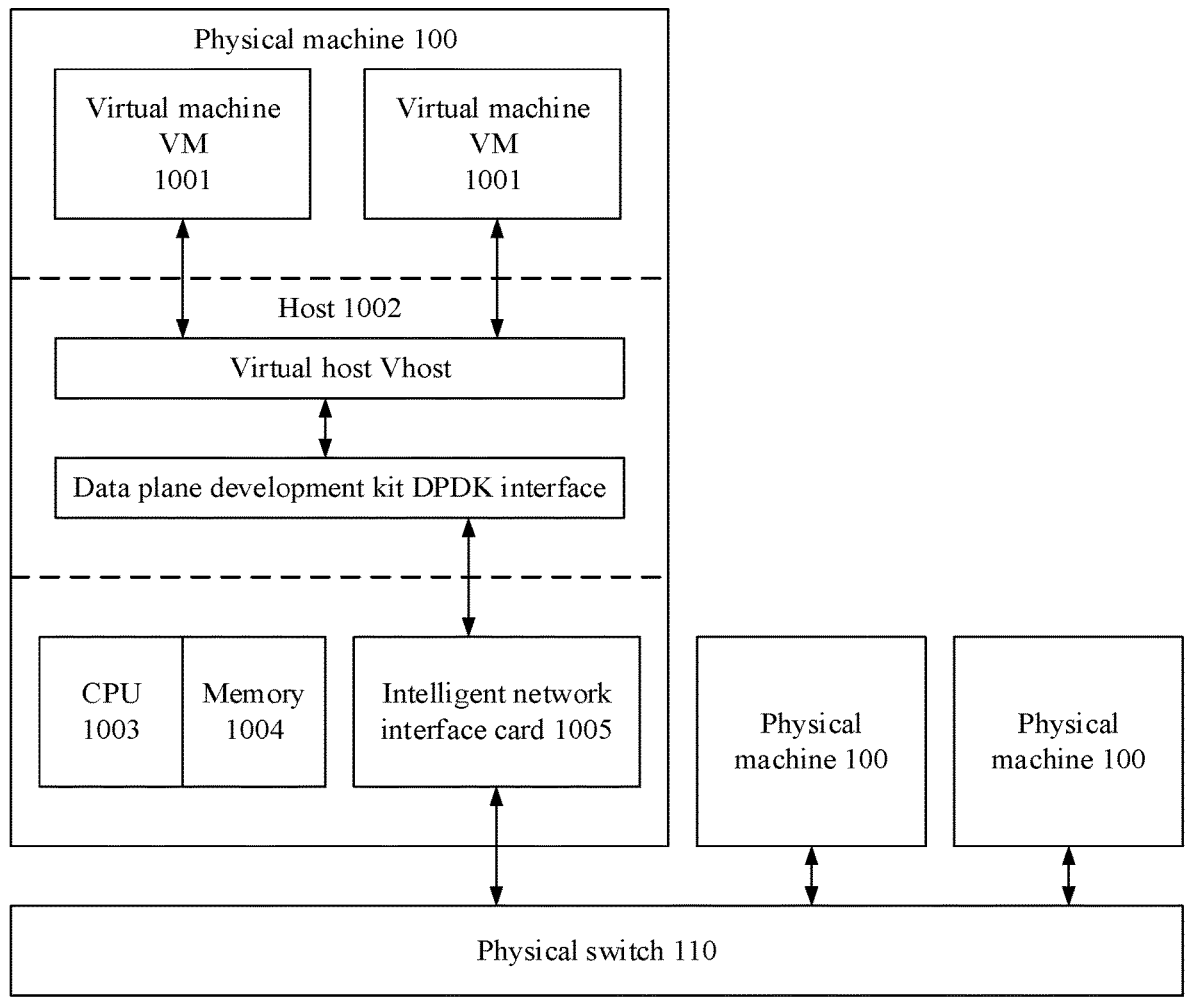
FIG. 1 is a schematic structural diagram of a network according to an embodiment of this application.

In the embodiments of this application, as shown in FIG. 1, this application is applied to a physical machine 100 running in a cloud computing environment. The physical machine 100 may be used for cloud computing. A plurality of physical machines 100 are connected through a physical switch 110, and each physical machine 100 has a complete software environment and a complete hardware environment. Hardware includes at least a CPU 1003, a memory 1004, and an intelligent network interface card 1005. A plurality of virtual machines (VM) 1001 run in the software environment of the physical machine 100, and are connected to the intelligent network interface card 1005 through a host 1002, to communicate with an external network.

In the embodiments of this application, the virtual machine 1001 is a virtual input/output front-end device, and the host 1002 may include a virtual input/output back-end device and a data plane development kit (DPDK) interface. The virtual input/output back-end device may be a virtual host (Vhost) or may be a virtual machine monitor (VMM). It should be understood that in the embodiments of this application, an example in which the virtual input/output back-end device is the virtual host is used for description.

Figure 2:
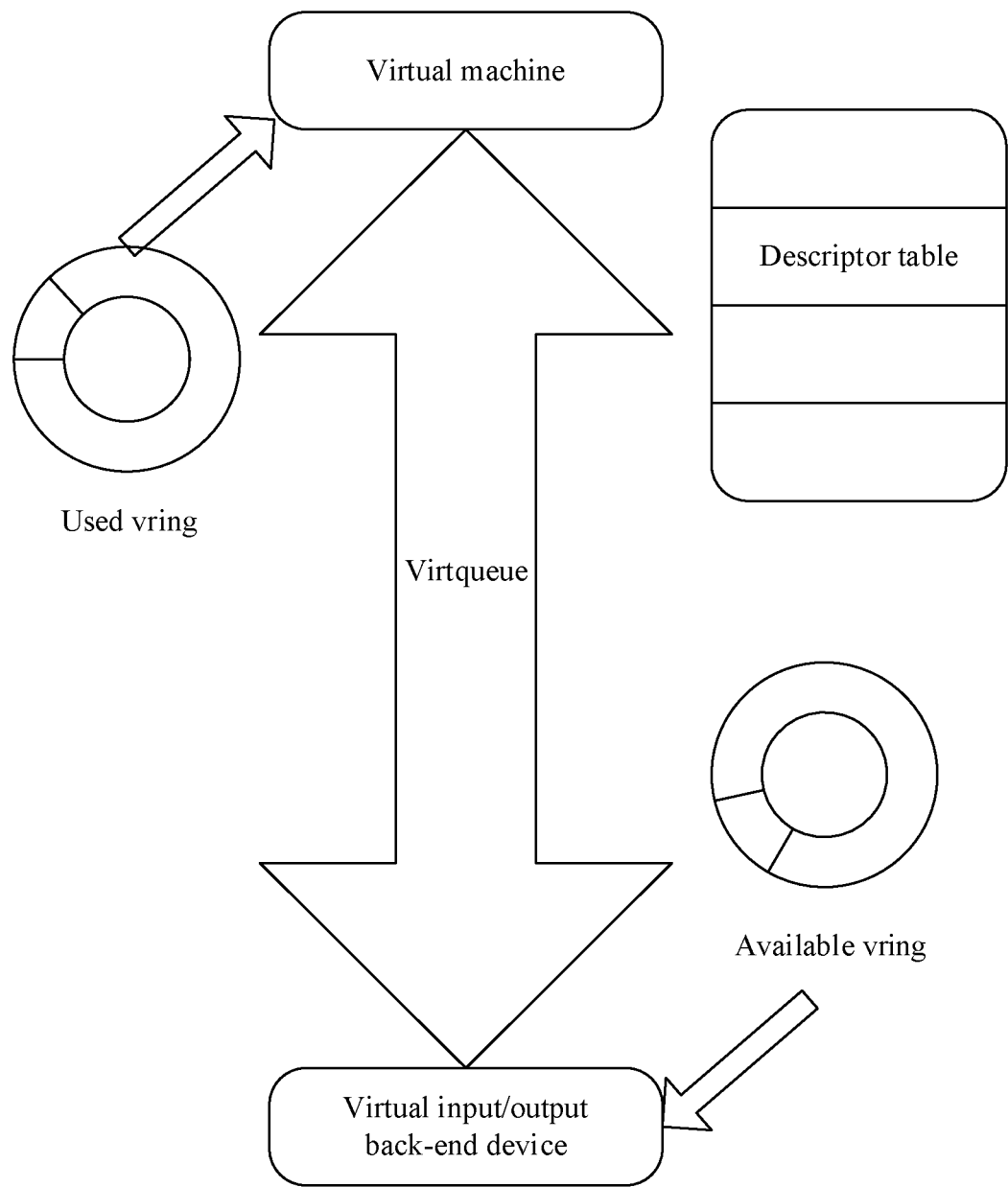
FIG. 2 is a schematic structural diagram of another network according to an embodiment of this application.

In the embodiments of this application, both the VM and the vhost are virtual input/output devices. Referring to FIG. 2, the virtual input/output device uses a virtual queue (Virtqueue) to implement an input/output mechanism of the virtual input/output device. Each virtqueue is a queue structure that carries a large amount of data. Virtqueues of the virtual input/output device in the embodiments of this application appear in pairs, where one virtqueue is used for data sending, and the other virtqueue is used for data reception.

In the embodiments of this application, a virtual ring (vring) is a specific implementation of the virtqueue, and the vring is described by using a corresponding descriptor table. As shown in FIG. 2, a virtqueue structure includes three parts: a descriptor tablean available vring, and a used vring.

One descriptor table includes a plurality of descriptors, and each descriptor describes an address space, and includes at least a start address of the address space, a length of the address space, and a descriptor identifier. The available vring records a descriptor identifier corresponding to a current available address space, and the used vring records a descriptor identifier corresponding to an address space that has been used by the host. The virtual machine reads the descriptor identifier from the used vring; obtains, from the descriptor table based on the descriptor identifier, a start address of an address space corresponding to a descriptor; and reads, based on the start address of the address space, data stored in the address space.

Figure 3:
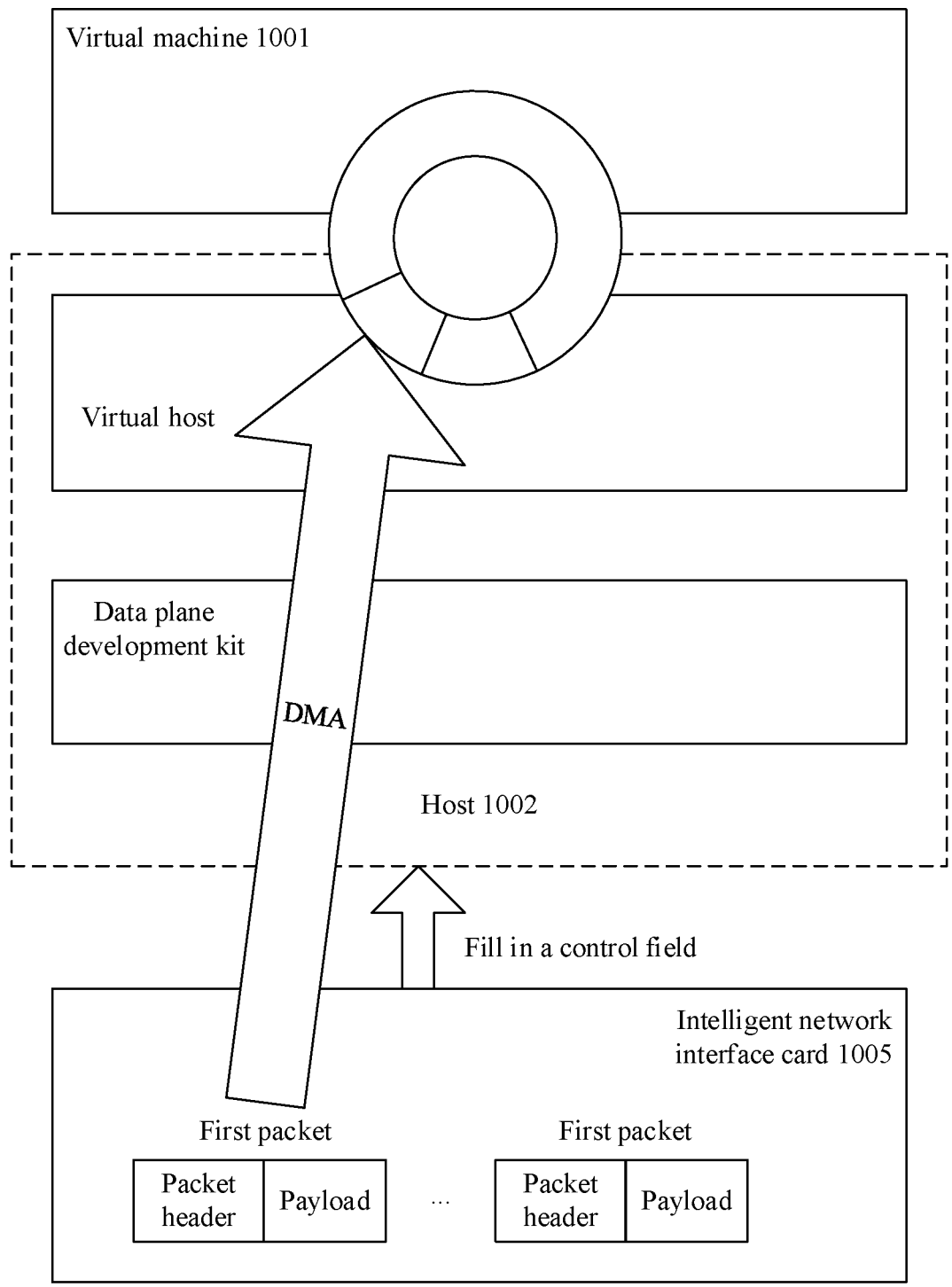
FIG. 3 is a schematic structural diagram of still another network according to an embodiment of this application.

Referring to FIG. 3, an embodiment of this application provides a physical machine. The physical machine 100 includes an intelligent network interface card 1005, a processor, and a memory. The processor runs a host 1002 and a virtual machine 1001 by running code in the memory. The host 1002 maintains an mbuf linked list that includes a plurality of memory buffers (mbuf). Each mbuf includes a control field and address information. The intelligent network interface card 1005 records a reception status of a first packet in a data flow. After receiving the first packet, the intelligent network interface card 1005 parses the first packet to obtain information carried in the first packet; fills in the control field of the mbuf based on the information carried in the first packet; and through DMA, stores a packet header and a payload of the first packet or stores a payload of the first packet into an address space indicated by the address information included in the mbuf, that is, into an address space that can be directly accessed by the virtual machine 1001. The host 1002 aggregates updated mbufs. When an aggregation termination condition is met, the virtual machine 1001 reads address information included in an mbuf obtained through aggregation, to obtain data in an address space indicated by the address information obtained through aggregation.

The intelligent network interface card 1005 and the host 1002 process the first packet in different manners in cases in which an aggregation position of the first packet is an initial position and in which an aggregation position of the first packet is not an initial position. The following separately describes the cases in which the aggregation position of the first packet is the initial position and in which the aggregation position of the first packet is not the initial position.

1. The aggregation position of the first packet is the initial position.

As shown in FIG. 1, the host 1002 may include the virtual host and the DPDK interface. When the aggregation position of the first packet is the initial position, the virtual host may maintain an mbuf linked list that includes a plurality of first mbufs, and the virtual host notifies the virtual machine 1001; or the DPDK interface may maintain an mbuf linked list that includes a plurality of first mbufs, and the virtual host notifies the virtual machine 1001. The following separately describes the cases in which the mbuf linked list is maintained by the virtual host and in which the mbuf linked list is maintained by the DPDK interface.

1. The virtual host maintains the mbuf linked list.

Figure 4A:
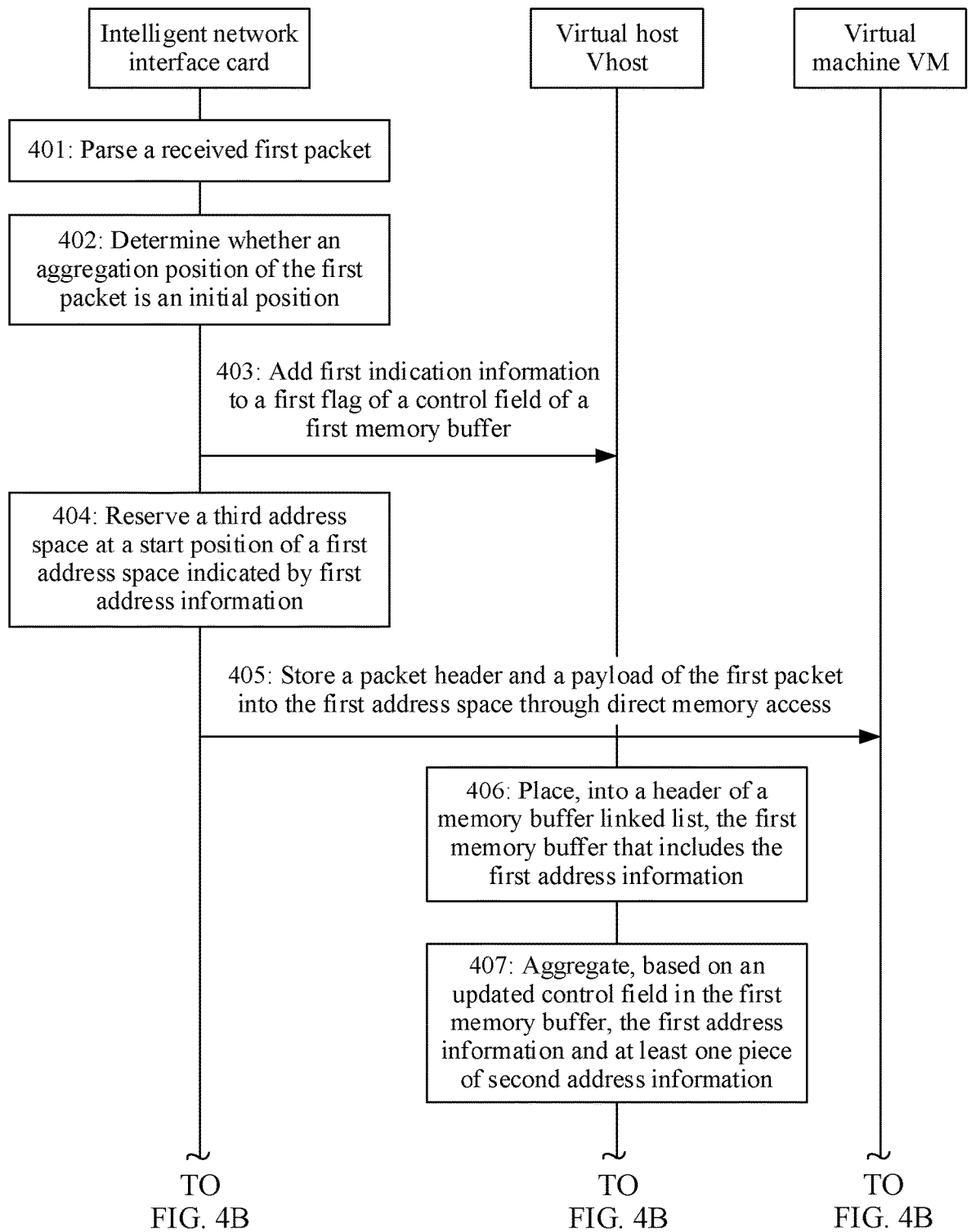
FIG. 4A and FIG. 4B are a schematic flowchart of a packet processing method according to an embodiment of this application.
Figure 4B:

The foregoing physical machine may be configured to perform the following packet processing method. Referring to FIG. 4A and FIG. 4B, in the embodiments of this application, an embodiment of the packet processing method may include the following operations.

401: An intelligent network interface card parses a received first packet.

In this embodiment, after receiving the first packet, the intelligent network interface card may obtain a packet header and a payload of the first packet after parsing the first packet. The packet header of the first packet includes an identifier of the first packet, and the identifier of the first packet may include an identifier of a data flow to which the first packet belongs and a packet sequence number of the first packet.

In this embodiment, the intelligent network interface card may receive, at a time, a plurality of first packets belonging to a same data flow, or may receive, at a plurality of times, a plurality of first packets belonging to a same data flow.

In this embodiment, the intelligent network interface card may receive the first packet from an external network, for example, receive the first packet from the internet. Alternatively, the intelligent network interface card may receive the first packet from a local virtual machine. For example, as shown in FIG. 1, a plurality of virtual machines may be configured on one physical machine 100, and the intelligent network interface card may receive the first packet from the local virtual machine. The first packet may be a transmission control protocol (TCP) packet. It should be understood that in this embodiment and subsequent embodiments, descriptions are provided by using the first packet as a TCP packet.

In this embodiment, the packet header of the first packet may include 5-tuple information, a subnet identifier, a packet sequence number, a packet type, a packet flag, other packet header information, or the like. The payload of the first packet is valid data carried in the first packet. The 5-tuple information may include a source internet protocol (IP) address, a source port number, a destination IP address, a destination port number, and a transport layer protocol number. The subnet identifier is used to identify a subnet to which a packet belongs, and is generally information such as a virtual local area network identifier (VLAN ID), a VXLAN network identifier (VNI), or an input port number. The packet sequence number is generated by a packet transmit end based on a packet dividing status when sending a packet. Because one data flow includes a plurality of packets, when dividing one data flow into a plurality of first packets, the transmit end numbers the plurality of first packets, adds the numbers to packet headers of the first packets, and sends the packet headers to a receive end, to indicate the receive end to process the plurality of first packets in a number order. In this embodiment and the subsequent embodiments, the receive end is the intelligent network interface card.

In this embodiment, the identifier of the data flow to which the first packet belongs may include the 5-tuple information and the subnet identifier of the first packet.

402: The intelligent network interface card determines, based on the identifier of the first packet, whether an aggregation position of the first packet is an initial position; and if the aggregation position of the first packet is the initial position, performs operation 403, or if the aggregation position of the first packet is not the initial position, performs operation 416.

In this embodiment, the intelligent network interface card stores an entry of a reception and aggregation status of the first packet. After obtaining the 5-tuple information and the subnet identifier included in the identifier of the first packet in operation 402, the intelligent network interface card may determine the data flow to which the first packet belongs; determine, based on the packet sequence number of the first packet, whether there is a second packet that is sorted before the first packet and that has not been aggregated in at least one second packet belonging to the data flow; and if there is no such a second packet, determine that the aggregation position of the first packet is the initial position, or if there is such a second packet, determine that the aggregation position of the first packet is not the initial position.

In this embodiment and the subsequent embodiments, the at least one second packet and the first packet that is received by the intelligent network interface card belong to a same data flow. The first packet is each packet received by the intelligent network interface card in a packet reception process, and the second packet is a packet that is received by the intelligent network interface card and that belongs to a same data flow as the first packet.

In this embodiment and the subsequent embodiments, the intelligent network interface card may store a correspondence table that records reception statuses of first packets belonging to a same data flow, to record reception and aggregation statuses of the first packets. Referring to Table 1, the correspondence table may include a plurality of entries, and each entry corresponds to one data flow. Each entry includes an identifier of a data flow to which a packet belongs and a mapping relationship between a sequence number of the packet and a number of the packet. The number of the packet is used to indicate an aggregation position of the packet. Each of the plurality of entries may further include an identifier of an mbuf linked list, a last update time point of the entry, other information, or the like. Details are not described herein.

In this embodiment and the subsequent embodiments, the identifier of the mbuf linked list may be the 5-tuple information and the subnet identifier. There may be a mapping relationship between the identifier of the mbuf linked list and the identifier of the data flow. After receiving the first packet, the intelligent network interface card generates the identifier of the mbuf linked list based on the 5-tuple information and the subnet identifier of the first packet, for example, a unique flow identifier (UFID) field in Table 1. Alternatively, the identifier of the mbuf linked list may be other data flow identification information or the like. It should be understood that, in this embodiment and the subsequent embodiments, an example in which the identifier of the mbuf linked list is the UFID is used for description.

In this embodiment and the subsequent embodiments, the intelligent network interface card may use the packet sequence number included in the identifier of the first packet as a number of the first packet, or may sort received first packets based on packet sequence numbers to generate second sequence numbers, or the like. A specific manner of generating the second sequence numbers is not limited herein.

In this embodiment and the subsequent embodiments, the last update time point is used to indicate an update time point at which an entry corresponding to a data flow is last updated. The last update time point may be a receiving time point of the last packet in a plurality of second packets received in one data flow, may be a time point generated based on a timestamp carried in the packet header of the first packet, or the like. A specific manner of generating the last update time point is not limited herein.

TABLE 1

| UFID | Identifier of a data flow | Number of the first packet | Last update time point |
|---|---|---|---|
| A | a | 5 | 1807160642364553222 |
| B | b | 8 | 1807160642364553468 |
| C | c | 3 | 1807160642364538246 |

The correspondence table shown in Table 1 includes four fields: the UFID, the identifier of the data flow, the number of the first packet, and the last update time point. A value of the last update time point field is in a form of timestamp, and the timestamp is a time point defined by a CPU. Three entries are extracted from the correspondence table in Table 1. Referring to Table 1, the first entry indicates the last first packet of a data flow whose identifier is a, the data flow is identified as A, a number that is of the first packet and that is generated based on a sequence number of the first packet is 5, and a last update time point of the first packet is 1807160642364553222; and the second entry indicates the last first packet of a data flow whose identifier is b, the data flow is identified as B, a number that is of the first packet and that is generated based on a sequence number of the first packet is 8, and a last update time point of the first packet is 1807160642364553468. Other entries are not described in detail one by one herein.

It should be understood that the correspondence table in the intelligent network interface card may alternatively be represented in another form, and should be flexibly set based on an actual application. This is not limited herein.

In this embodiment, the intelligent network interface card searches the correspondence table for the number of the first packet based on the identifier of the data flow to which the first packet belongs and the sequence number of the first packet; and when the number of the first packet is a preset value, the intelligent network interface card determines that the aggregation position of the first packet is the initial position; or when the number of the first packet is not a preset value, the intelligent network interface card determines that the aggregation position of the first packet is not the initial position.

In this embodiment, after obtaining the identifier of the first packet, the intelligent network interface card obtains, from the identifier of the first packet, the identifier of the data flow to which the first packet belongs, namely, the 5-tuple information and the subnet identifier that are carried in the packet header of the first packet. Because 5-tuple information carried in packet headers of a plurality of second packets belonging to a same data flow is the same, and subnet identifiers carried in the packet headers of the plurality of second packets belonging to the same data flow are the same, the intelligent network interface card may determine, based on the 5-tuple information and the subnet identifier of the first packet, and the correspondence table, a target entry corresponding to the first packet. After determining the target entry that records the data flow, the intelligent network interface card determines the number of the first packet based on the packet sequence number of the first packet and a mapping relationship between the packet sequence number of the first packet and the number of the first packet. When the number of the first packet is the preset value, the intelligent network interface card determines that the aggregation position of the first packet is the initial position; or when the number of the first packet is not the preset value, the intelligent network interface card determines that the aggregation position of the first packet is not the initial position. The intelligent network interface card records a reception status of the first packet based on the correspondence table. This can be easily operated and implemented, thereby improving implementability of this solution.

In this embodiment, the preset value may be 0 or another value. This is not limited herein.

In this embodiment and the subsequent embodiments, that the intelligent network interface card obtains, based on the identifier of the first packet, the target entry corresponding to the first packet includes:

the intelligent network interface card determines whether the target entry is included in the plurality of entries included in the correspondence table, where an identifier, included in the target entry, of the data flow corresponds to the identifier of the first packet; and if the target entry is not included in the plurality of entries, the intelligent network interface card generates, based on the 5-tuple information and the subnet identifier of the first packet, the identifier of the data flow corresponding to the first packet, and the intelligent network interface card adds the generated identifier of the data flow to the correspondence table, to generate the target entry corresponding to the first packet; or if the target entry is included in the plurality of entries, the intelligent network interface card reads the target entry in which the identifier of the data flow is located.

In this embodiment, after obtaining the 5-tuple information and the subnet identifier of the first packet through parsing, the intelligent network interface card traverses each entry in the foregoing correspondence table, to determine whether the target entry corresponding to the first packet is included in the correspondence table. If the correspondence table does not include a UFID corresponding to the 5-tuple information and the subnet identifier of the first packet, the intelligent network interface card generates, based on the 5-tuple information and the subnet identifier of the first packet, the identifier of the data flow including the first packet, and adds the generated identifier of the data flow to the correspondence table, to generate the target entry corresponding to the data flow. If the correspondence table includes a UFID corresponding to the 5-tuple information and the subnet identifier of the first packet, the intelligent network interface card reads the target entry in which the UFID is located, to ensure that each data flow received by the intelligent network interface card is recorded in the correspondence table. This ensures integrity of data in the correspondence table.

In this embodiment, the preset value is a value preset by the intelligent network interface card, and may be a value identifying that the aggregation position of the first packet is the initial position, for example, a value of the second sequence number is 0 or 1. Alternatively, the preset value may be a first preset threshold, for example, a value of the second sequence number is 16, 15, 14, or the like. When the value of the second sequence number reaches the first preset threshold, that is, when the intelligent network interface card determines that a quantity of a plurality of to-be-aggregated second packets reaches the first preset threshold, the intelligent network interface card needs to aggregate the plurality of second packets of the quantity of the first preset threshold.

In this embodiment and the subsequent embodiments, the packet processing method may further include:

the intelligent network interface card determines whether a quantity of the plurality of entries reaches a second preset threshold;

if the quantity reaches the second preset threshold, the intelligent network interface card obtains a last update time point of each of the plurality of entries;

the intelligent network interface card determines a difference between the last update time point of each entry and a current time point;

the intelligent network interface card determines whether there is an entry whose difference between a last update time point and the current time point exceeds a third preset threshold in the plurality of entries; and if there is an entry whose difference between a last update time point and the current time point exceeds the third preset threshold, the intelligent network interface card deletes the entry whose difference between the last update time and the current time point exceeds the third preset threshold.

In this embodiment, because the intelligent network interface card receives an increasing quantity of different data flows, but a size of the correspondence table maintained by the intelligent network interface card may be fixed, that is, a quantity of entries that can be stored in the correspondence table may reach the second preset threshold, when the intelligent network interface card generates a new entry based on new 5-tuple information and a new subnet identifier, the intelligent network interface card may determine whether a quantity of a plurality of entries that need to be stored in the correspondence table reaches the second preset threshold. If the quantity reaches the second preset threshold, the intelligent network interface card obtains a last update time point of each of the plurality of entries from the correspondence table, and obtains a current time point, to determine a difference between the last update time point of each entry and the current time point. The intelligent network interface card determines whether there is an entry whose difference between a last update time and the current time point exceeds the third preset threshold in the plurality of entries. If there is an entry whose difference between a last update time and the current time point exceeds the third preset threshold, the intelligent network interface card deletes the entry whose difference between the last update time and the current time point exceeds the third preset threshold. This ensures that a data flow corresponding to an entry stored in the correspondence table is in an active packet transmission state, thereby improving usage of each entry in the correspondence table.

The second preset threshold is a value preset by the intelligent network interface card. The second preset threshold may be 2M, that is, 2097152 (2×1024×1024), or may be 3M, that is, 3145728 (2×1024×1024), or may be another value. The second preset threshold may be flexibly set by the intelligent network interface card based on factors such as a processing capability of the intelligent network interface card and a quantity of data flows actually processed by the intelligent network interface card. The examples herein are merely used for ease of understanding, and the second preset threshold is not limited.

The third preset threshold is a value preset by the intelligent network interface card. Values of the third preset threshold may be different when the data flow to which the first packet belongs is in different states. For example, when three-way handshake of a TCP link is completed, the data flow to which the first packet belongs is in a stable state; when the intelligent network interface card receives a packet used to indicate connection termination, the data flow to which the first packet belongs is in a terminated state. A third preset threshold in the stable state is greater than a third preset threshold in the terminated state. It should be understood that the example herein is merely used for ease of understanding, and different states of the data flow and the third preset threshold should be flexibly set based on an actual application. This is not limited herein.

403: The intelligent network interface card adds first indication information to a first flag of a control field of a first memory buffer mbuf.

In this embodiment, a virtual host maintains the mbuf linked list, and each mbuf linked list includes a plurality of mbufs. After parsing the first packet, the intelligent network interface card may determine the first mbuf corresponding to the first packet, where each mbuf includes a control field and first address information. When the aggregation position of the first packet is the initial position, the intelligent network interface card adds the first indication information to the first flag of the control field corresponding to the first packet, and fills a UFID of the first packet in a UFID field of the control field. The first indication information is used to indicate that the first packet carries the packet header.

Figure 5:
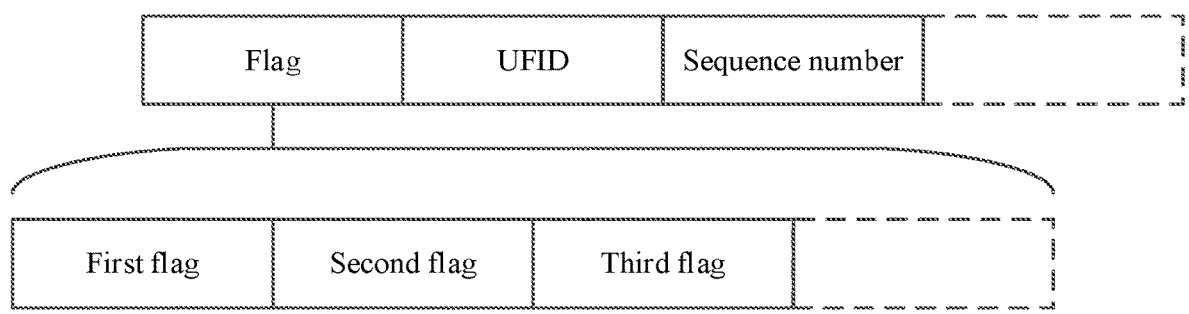
FIG. 5 is a schematic structural diagram of a control field of a memory buffer according to an embodiment of this application.

In this embodiment and the subsequent embodiments, an mbuf is a data structure used for data transmission. As shown in FIG. 5, the control field includes at least a flag field, a UFID field, and a sequence number field. The flag field includes at least a first flag. When the first indication information exists in the first flag, it may indicate that the first packet corresponding to the control field carries the packet header, that is, the aggregation position of the first packet corresponding to the control field is the initial position. For example, the first flag may be FLAG_PKTHDR, and the first indication information may be 1. For another example, the first flag may be FLAG_PKTHDR, and the first indication information may be 0. It should be understood that the intelligent network interface card and the virtual host may update a name of the first flag as required, and specific representation forms of the first flag and the first indication information are not limited herein, provided that the first indication information identifies, when the first indication information exists in the first flag, that the first packet carries the packet header.

In this embodiment, address information included in each mbuf indicates an address space, and a first address space indicated by the first address information is an address space that can be directly accessed by both the virtual host and the virtual machine. The virtual host can determine address information of an available address space, and the virtual host packages an address space described by each descriptor into an address space in an mbuf format. In this case, the intelligent network interface card may determine, in the following manner, the first mbuf corresponding to the first packet: After receiving the first packet, the intelligent network interface card requests, from the virtual host, the first mbuf corresponding to a size of the first packet, and receives address information of the first mbuf returned by the virtual host; or address information of the first mbuf may be pre-written into the intelligent network interface card, and the intelligent network interface card learns of the address information of the first mbuf from stored information after receiving the first packet. It should be understood that the intelligent network interface card may alternatively determine, in another manner, the first mbuf corresponding to the first packet. A specific manner of determining the first mbuf is not limited herein.

404: The intelligent network interface card reserves a third address space with a length of a virtual input/output virtio protocol header at a start position of the first address space indicated by the first address information.

In this embodiment, after determining the first address space indicated by the first address information, the intelligent network interface card reserves the third address space at the start position of the first address space, where the length of the third address space is a length of the virtual input/output (Virtio) protocol header.

In this embodiment, the intelligent network interface card may prestore the length of the virtio protocol header. The virtio protocol header supports packet reception in an aggregation manner. For example, the length of the virtio protocol header may be 12 bytes or another value. The length of the virtio protocol header is not limited herein.

405: The intelligent network interface card stores the packet header and the payload of the first packet into the first address space through DMA.

In this embodiment, after the intelligent network interface card determines the first address space indicated by the first address information, because the aggregation position of the first packet is the initial position, the intelligent network interface card stores, through DMA, the packet header and the payload of the first packet into the first address space indicated by the first address information. In this way, the packet header is also retained in a packet obtained through aggregation, to ensure that a packet header of a packet obtained after aggregation is consistent with a packet header of a corresponding to-be-aggregated packet. The first address space indicated by the first address information is an address space that can be directly accessed by both the virtual host and the virtual machine.

It may be understood that operation 404 and operations 405 and 406 are not sequential in this embodiment, and operation 404 may be performed before or after operations 405 and 406.

406: The virtual host places, into a header of the mbuf linked list, the first mbuf that includes the first address information.

In this embodiment, after obtaining the control field of the first mbuf, the virtual host determines whether the first indication information exists in the first flag of the control field. When the first indication information exists in the first flag of the control field, the virtual host determines that the first packet corresponding to the first mbuf carries the packet header, and places the first mbuf into the header of the mbuf linked list.

407. The virtual host aggregates the header of the mbuf linked list and at least one piece of second address information.

In this embodiment, each mbuf linked list corresponds to one data flow, and the control field in the first mbuf further includes the identifier of the data flow. After obtaining the first mbuf that is used as the header of the mbuf linked list, the virtual host may further receive at least one second packet that belongs to a same data flow as the first packet, and updates a control field of a second mbuf based on an identifier of the second packet. The second mbuf includes second address information that is in a virtual machine and that is allocated to the second packet. After receiving the second packet, the virtual host updates the second mbuf based on the identifier of the second packet, and aggregates the first mbuf that includes the first address information and the second mbuf that includes the second address information.

In this embodiment, the control field of each mbuf further includes a data flow identifier and an mbuf pointer. The mbuf pointer is used to connect a plurality of mbufs into one mbuf linked list. In this application, aggregation means that a plurality of mbufs with a same data flow identifier in the control field are connected into one mbuf linked list by using the mbuf pointer.

408: When the aggregation termination condition is met, the virtual host writes the virtio protocol header into the third address space.

In this embodiment, the mbuf linked list includes a plurality of second mbufs corresponding to second packets. After the intelligent network interface card fills in the control field of the mbuf based on information carried in the plurality of second packets, and stores, through DMA, the plurality of second packets into the address space indicated by the address information, the virtual host needs to determine whether the plurality of second packets meet the aggregation termination condition. Because the virtual host can directly access the address space indicated by the first address information, when the aggregation termination condition is met, the virtual host fills the virtio protocol header in the third address space reserved at the start position of the first address space. The virtio protocol header carries at least an address space quantity field, and the field is used to indicate a quantity of address spaces occupied by a packet obtained through aggregation. The virtual host determines, based on a quantity of pieces of second address information included in the mbuf linked list, the quantity of address spaces occupied by the packet obtained through aggregation.

In this embodiment, in an implementation, each mbuf further includes a sequence number field. The sequence number field is used to indicate an aggregation position of a packet, and the aggregation position is also an aggregation position of address information when the first address information and the at least one piece of second address information are aggregated. The virtual host may determine, in the following manner, whether the aggregation termination condition is met: The virtual host obtains a control field of the last first mbuf in the plurality of second mbufs included in the mbuf linked list, and determines whether a value of a sequence number field of the last first mbuf reaches a fourth preset threshold; and if the value reaches the fourth preset threshold, the virtual host determines that the aggregation termination condition is met. The fourth preset threshold may be 16, 15, 14, or another value. A setting of the fourth preset threshold is not limited herein.

In another implementation, the virtual host may determine, in the following manner, whether the plurality of second packets meet the aggregation termination condition: The virtual host obtains a control field of the last first mbuf in the plurality of second mbufs included in the mbuf linked list, and determines whether fifth indication information is filled in a fifth flag of the last first mbuf, where the fifth indication information is used to indicate that the aggregation termination condition is met; and if the fifth indication information exists in the fifth flag of the last first mbuf, the virtual host determines that the aggregation termination condition is met. For example, the fifth flag may be FLAG_END, and the fifth indication information may be 1. It should be understood that the examples of the fifth flag and the fifth indication information herein are merely used for ease of understanding this solution, and do not constitute any limitation on values of the fifth flag and the fifth indication information.

In still another implementation, the virtual host may determine, in the following manner, whether the plurality of second packets meet the aggregation termination condition: The virtual host obtains a control field of the last first mbuf in the plurality of second mbufs included in the mbuf linked list, and determines whether first indication information is filled in a first flag of the last first mbuf, where the first indication information is used to indicate that the first packet carries the packet header; and if the first indication information exists in the first flag of the last first mbuf, the virtual host determines that the aggregation termination condition is met, and obtains, from the plurality of second mbufs belonging to the mbuf linked list, a previous first mbuf in which the first indication information exists in the first flag. The plurality of second mbufs are a plurality of second mbufs, belonging to a same mbuf linked list, between two first packets of which the first indication information exists in each first flag. The plurality of second mbufs include the previous first packet in which the first indication information exists in the first flag. For example, there are a plurality of second mbufs in an mbuf linked list, 1 exists in FLAG_PKTHDR of a control field of the $1^{st}$ first mbuf in the mbuf linked list, 1 does not exist in FLAG_PKTHDR of control fields of the $2^{rd}$ first mbuf to the $16^{th}$ first mbuf in the mbuf linked list 1, and 1 exists in FLAG_PKTHDR of a control field of the $17^{th}$ first mbuf in a target aggregated queue. In this case, the plurality of second mbufs that include the $1^{st}$ first mbuf to the $16^{th}$ first mbuf in the mbuf linked list meet the aggregation condition. It should be understood that the example herein is merely used for ease of understanding this solution, and does not constitute any limitation on values of the first flag, the first indication information, and the quantity of the plurality of second packets.

In still another implementation, the virtual host may determine, in the following manner, whether the plurality of second packets meet the aggregation termination condition: After obtaining the first mbuf that is used as the header of the mbuf linked list, the virtual host may have a timer for recording an existence time of the mbuf linked list; and when the existence time of the mbuf linked list exceeds a preset time threshold, the virtual host determines that the plurality of second mbufs meet the aggregation termination condition. For example, the preset time threshold may be 20 microseconds. When the timer learns that aggregation is not performed after the mbuf linked list exists for 20 microseconds, the virtual host determines that the plurality of second mbufs meet the aggregation termination condition. It should be understood that the preset time threshold may be alternatively 30 microseconds or another value. The examples of the preset time threshold herein are merely used for ease of understanding and do not constitute any limitation.

It should be understood that, the virtual host may determine, in another manner, whether the aggregation termination condition is met. This may be flexibly set based on an actual application, and details are not described herein.

409: The virtual host places address information obtained through aggregation into a used vring.

In this embodiment, after filling in the virtio protocol header, the virtual host writes, into the used vring, a plurality of pieces of second address information included in the plurality of second mbufs stored in the mbuf linked list, and sends an interrupt instruction to the virtual machine to instruct the virtual machine to read the second address information from the used vring.

In this embodiment, the intelligent network interface card parses the first packet, so that CPU resources consumed for parsing the first packet are saved. In addition, the intelligent network interface card stores, through DMA, the first packet into the address space indicated by the first address information, so that the host can directly aggregate packets stored in the address space through DMA. This prevents software from copying the first packet in a mobile manner from an original position to a target position, and saves CPU resources consumed when the software copies the first packet in the mobile manner.

410: The virtual machine reads the address information obtained through aggregation, to obtain data in an address space indicated by the address information obtained through aggregation.

In this embodiment, the virtual machine reads the address information obtained through aggregation and included in the used vring. The address information obtained through aggregation may include a plurality of pieces of second address information, and the second address information may be a descriptor identifier corresponding to a second address space. A start address of the second address space is stored in a descriptor. After the virtual machine obtains start addresses of a plurality of second address spaces, the virtual machine sequentially reads, based on read descriptor identifiers corresponding to second address spaces in which a plurality of second packets are stored, the data in the address space indicated by the address information obtained through aggregation.

411: The intelligent network interface card parses a received third packet.

In this embodiment, the intelligent network interface card may parse the received third packet to obtain information carried in the third packet. The information carried in the third packet indicates that the third packet is a packet that does not need to be aggregated. The information carried in the third packet includes a packet header and a payload of the third packet, and the packet header of the third packet includes at least a packet type and a packet flag.

The intelligent network interface card may determine, in the following manner based on the information carried in the third packet, whether the third packet needs to be aggregated: The intelligent network interface card determines, based on the packet flag carried in the packet header of the third packet, whether indication information exists in a special flag in the packet header of the third packet; and if the indication information exists in the special flag in the packet flag of the third packet, determines that the third packet is the packet that does not need to be aggregated. The special flag may be TCP_PSH. When 1 exists in the special flag, it indicates that the third packet needs to be sent immediately. The special flag may be alternatively TCP_FIN. When 1 exists in the special flag, it indicates that a TCP connection to which the third packet belongs ends. The special flag may be alternatively TCP_CWR. When 1 exists in the special flag, it indicates that a TCP window to which the third packet belongs changes. The special flag may be alternatively another special flag, or the like. It should be understood that the examples herein are merely used for ease of understanding, and do not constitute any limitation on the special flag and the indication information on the special flag.

Alternatively, the intelligent network interface card may determine, in the following manner based on the information carried in the third packet, whether the third packet needs to be aggregated: After obtaining a data flow to which the third packet belongs, the intelligent network interface card determines a time interval between time points at which any two adjacent third packets are received; the intelligent network interface card determines whether the time interval exceeds a preset time interval; and if the time interval exceeds the preset time interval, the intelligent network interface card determines that the third packet is the packet that does not need to be aggregated.

Alternatively, the intelligent network interface card may determine, in any combination of the foregoing three determining manners based on the information carried in the third packet, that the third packet is the packet that does not need to be aggregated. For example, the intelligent network interface card determines whether the third packet is a TCP packet; if the third packet is the TCP packet, the intelligent network interface card determines whether indication information exists in a special flag in the packet header of the third packet; and if the indication information exists in the special flag in the packet flag of the third packet, the intelligent network interface card determines that the third packet is the packet that does not need to be aggregated. For another example, the intelligent network interface card determines whether a time interval between a time point at which the third packet is received and a time point at which a fifth packet is received exceeds a preset time interval; if the time interval does not exceed the preset time interval, the intelligent network interface card determines whether indication information exists in a special flag in the packet header of the third packet; and if the indication information exists in the special flag in the packet flag of the third packet, the intelligent network interface card determines that the third packet is the packet that does not need to be aggregated. Other specific determining manners are not enumerated herein.

412: The intelligent network interface card adds third indication information to a third flag of a control field of a third mbuf.

In this embodiment, the control field of the third mbuf further includes the third flag and a fourth flag, and the third flag is used to identify whether the third packet needs to be sent immediately. When the intelligent network interface card determines, based on the information carried in the third packet, that the third packet is the packet that does not need to be aggregated, the intelligent network interface card adds the third indication information to the third flag, where the third indication information is used to indicate that the third packet needs to be immediately sent. For example, the third flag may be FLAG_FLUSH, and the third indication information may be 1. It should be understood that the example herein is merely used for ease of understanding this solution, and specific settings of the third flag, the fourth flag, and the third indication information are not limited herein.

413: The intelligent network interface card stores, through DMA, the packet header and the payload of the third packet into a fourth address space indicated by third address information.

In this embodiment, when the intelligent network interface card determines, based on the information carried in the third packet, that the third packet is the packet that does not need to be aggregated, the third mbuf that is obtained by the intelligent network interface card and that corresponds to the third packet includes the third address information. After the virtio protocol header is reserved at a start position of the third address space, the intelligent network interface card stores, through direct memory access, the packet header and the payload of the third packet into the fourth address space indicated by the third address information.

414: The virtual host sends a notification to the virtual machine.

In this embodiment, after the virtual host obtains the control field of the third mbuf, because the third indication information exists in the third flag of the third mbuf, the virtual host learns that the third packet needs to be immediately sent to the virtual machine. In this case, the virtual host fills the virtio protocol header at the start position of the third address space, writes the third address information included in the third mbuf into the used vring, and sends an interrupt instruction to the virtual machine to instruct the virtual machine to read the third address information from the used vring.

415: The virtual machine reads the third address information based on the notification, to obtain the third packet stored in the fourth address space.

416: The intelligent network interface card executes another program.

2. The DPDK interface maintains the mbuf linked list.

Figure 6A:
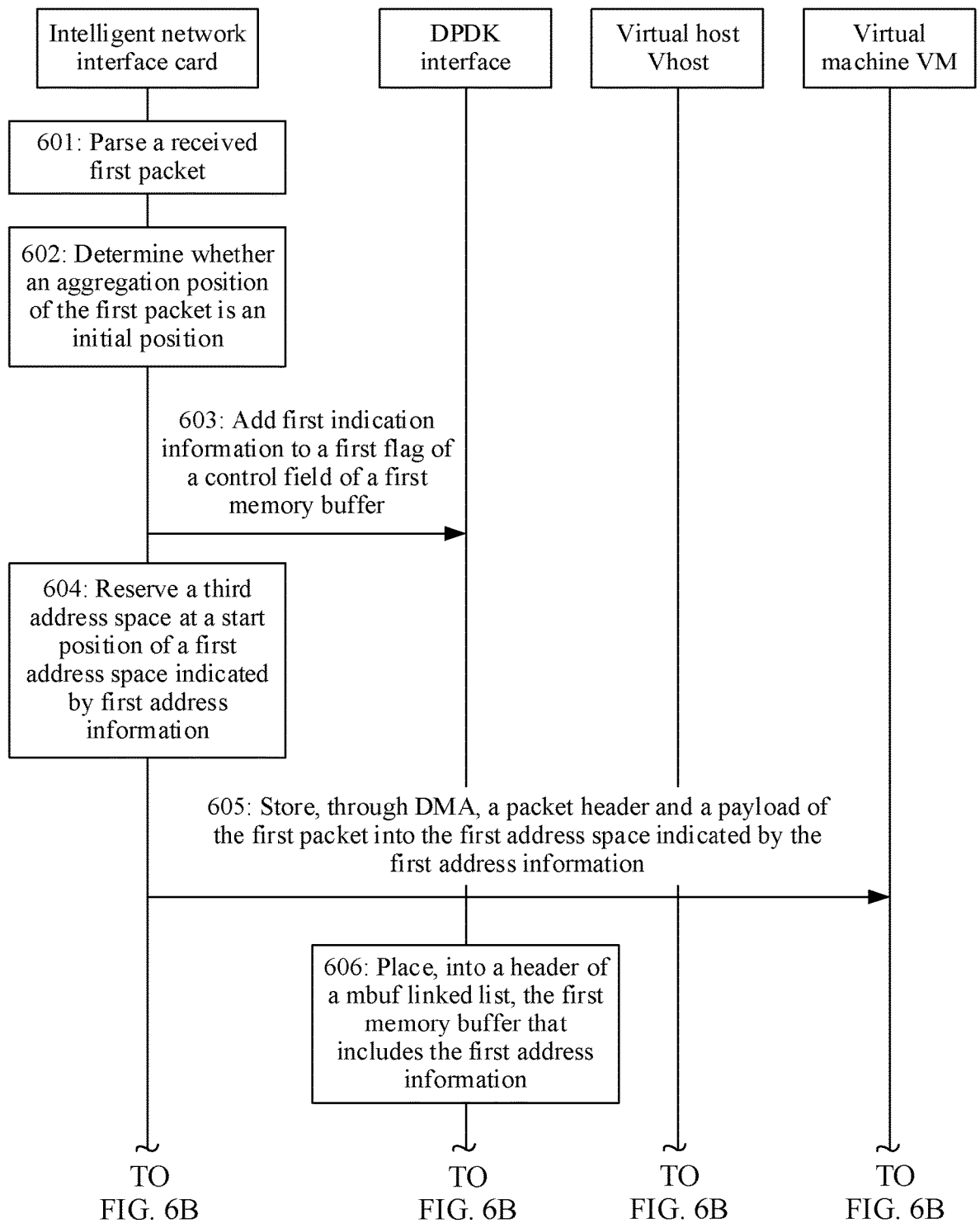
FIG. 6A and FIG. 6B are another schematic flowchart of a packet processing method according to an embodiment of this application.
Figure 6B:
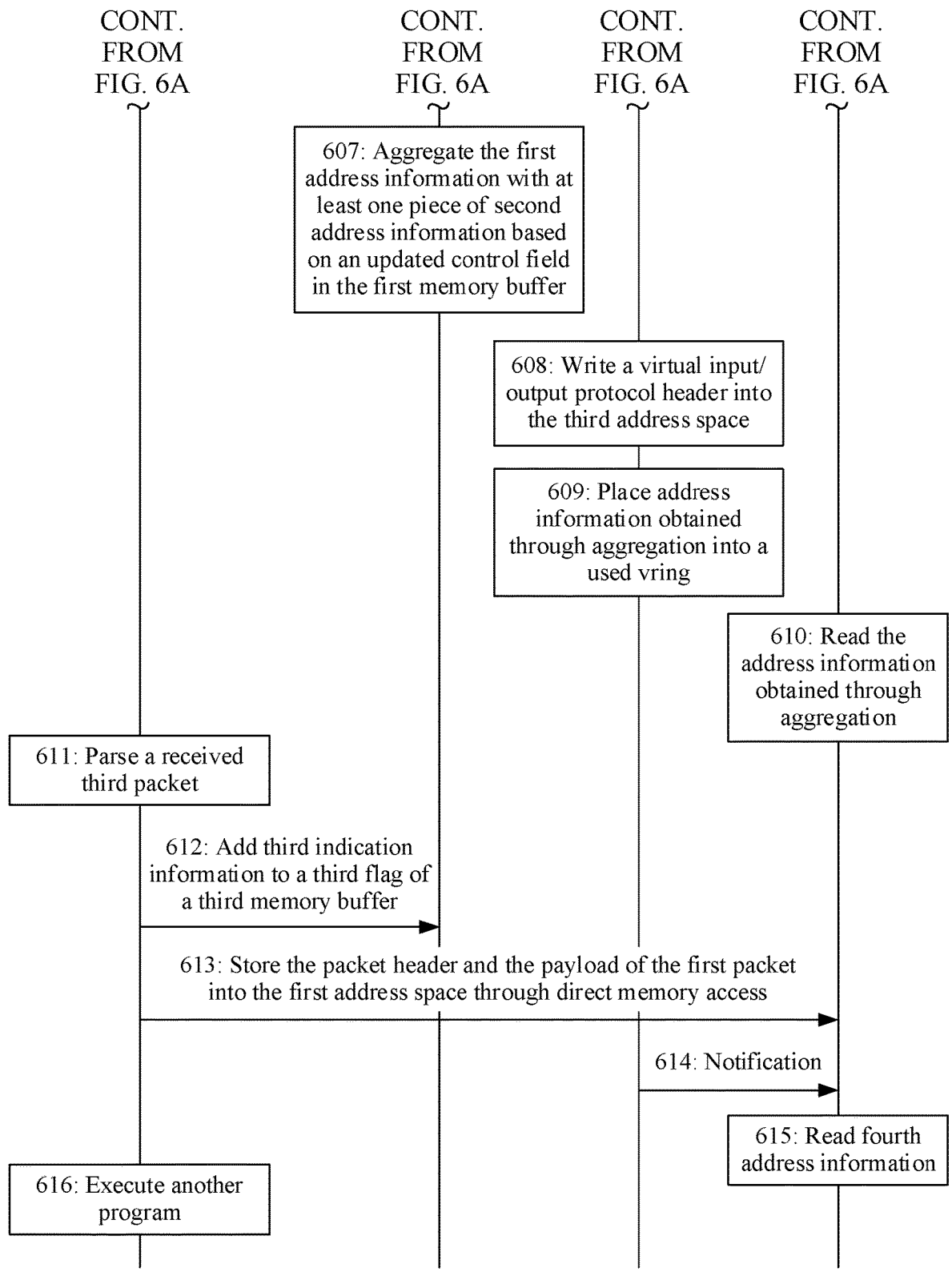

Referring to FIG. 6A and FIG. 6B, in the embodiments of this application, another embodiment of a packet processing method may include the following operations.

In this embodiment, operations 601 and 602 are similar to operations 401 and 402 in the foregoing embodiment shown in FIG. 4A. Details are not described herein again.

603: The intelligent network interface card adds first indication information to a first flag of a control field of a first mbuf, where an mbuf linked list to which the first mbuf belongs is maintained by the DPDK interface.

In this embodiment, the DPDK interface maintains the mbuf linked list using a pool mode driver (PMD) process, where the mbuf linked list includes a plurality of mbufs. After parsing the first packet, the intelligent network interface card may determine the first mbuf corresponding to the first packet, where each mbuf includes a control field and address information. When the aggregation position of the first packet is the initial position, the intelligent network interface card adds the first indication information to the first flag of a control field corresponding to the first packet, and fills a UFID of the first packet in a UFID field of the control field, where the first indication information is used to indicate that the first packet carries a packet header.

In this embodiment, the address information included in each mbuf indicates an address space, and the address space is an address space that is described by a descriptor and that can be directly accessed by both the virtual host and the virtual machine. The virtual host may determine an available address space, and the virtual host packages an available address space described by the descriptor into an address space in an mbuf format. In this case, the intelligent network interface card determines the first mbuf corresponding to the first packet may be in the following manner: After receiving the first packet, the intelligent network interface card requests the first mbuf corresponding to a size of the first packet from the DPDK interface, and receives address information of the first mbuf returned by the DPDK; or address information of the first mbuf may be pre-written into the intelligent network interface card using the PMD process, and the intelligent network interface card learns of the address information of the first mbuf from the stored information after receiving the first packet. It should be understood that the intelligent network interface card may determine, in another manner, the first mbuf corresponding to the first packet. A specific manner of determining the first mbuf is not limited herein.

In this embodiment, operations 604 and 605 are similar to operations 404 and 405 in the foregoing embodiment shown in FIG. 4A. Details are not described herein again.

In this embodiment, operations 606 to 608 are similar to operations 406 to 408 in the foregoing embodiment shown in FIG. 4A and FIG. 4B. Operations 606 to 608 are different from operations 406 to 408 in execution bodies. Operations 406 to 408 are performed by the virtual host, but operations 606 to 608 are performed by the DPDK interface. Details are not described herein again.

In this embodiment, operations 609 to 613 are similar to operations 409 to 413 in the foregoing embodiment shown in FIG. 4A and FIG. 4B. Details are not described herein again.

In this embodiment, operation 614 is similar to operation 414 in the embodiment shown in FIG. 4A and FIG. 4B, and a difference between operation 614 and operation 414 lies in different execution bodies. Operation 414 is performed by the virtual host, but operation 614 is performed by the DPDK interface. Details are not described herein again.

In this embodiment, operations 615 and 616 are similar to operations 415 and 416 in the foregoing embodiment shown in FIG. 4A and FIG. 4B. Details are not described herein again.

2. The aggregation position of the first packet is not the initial position.

As shown in FIG. 1, the host may include the virtual host and the DPDK interface. When the aggregation position of the first packet is not the initial position, the virtual host may maintain the mbuf linked list that includes a plurality of first mbufs, and the virtual host notifies the virtual machine 1001; or the DPDK interface may maintain the mbuf linked list that includes a plurality of first mbufs, and the virtual host notifies the virtual machine 1001. When the aggregation position of the first packet is not the initial position, the following separately describes the cases in which the virtual host maintains the mbuf linked list and in which the DPDK interface maintains the mubf linked list.

1. The virtual host maintains the mbuf linked list.

Figure 7A:
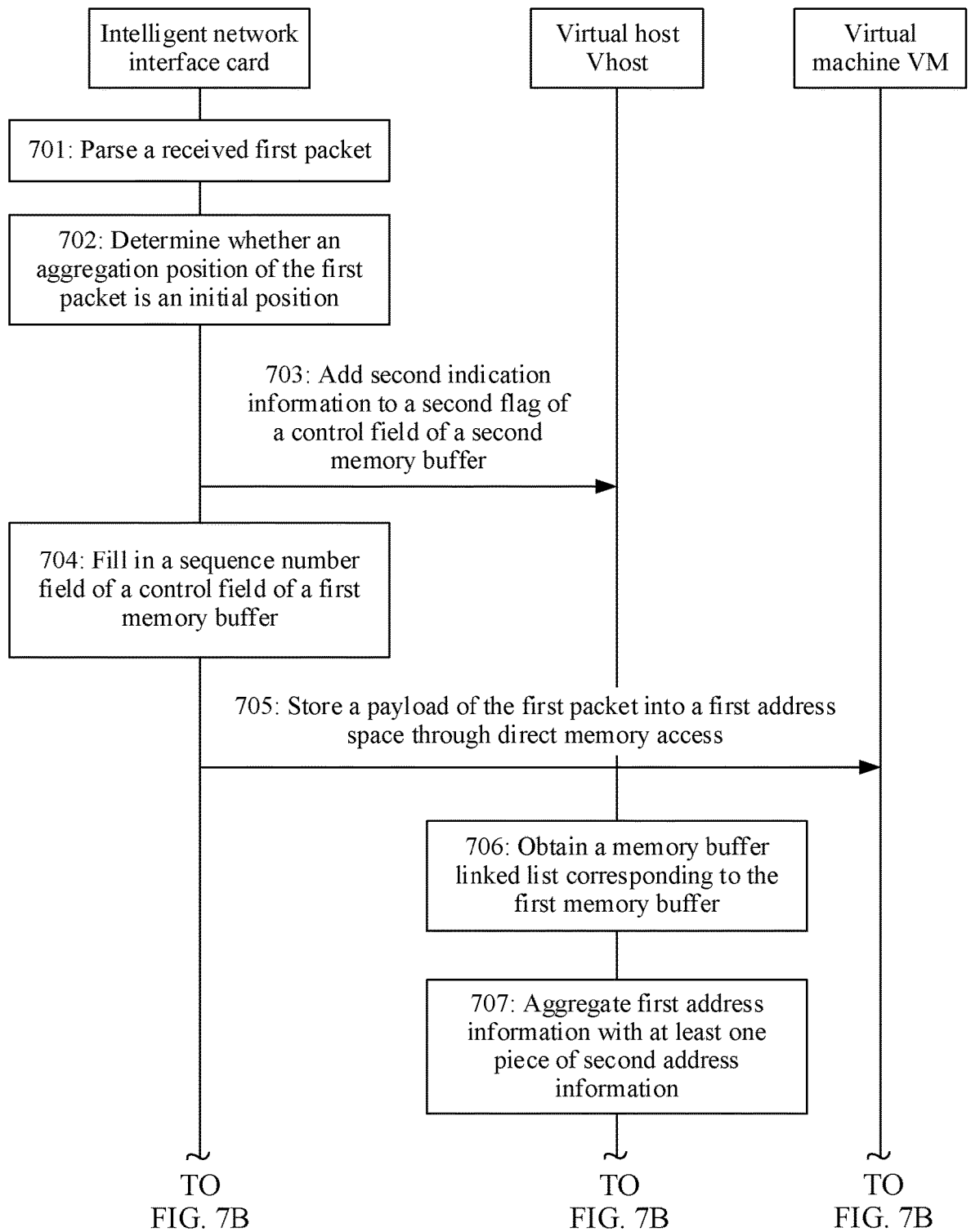
FIG. 7A and FIG. 7B are still another schematic flowchart of a packet processing method according to an embodiment of this application.
Figure 7B:
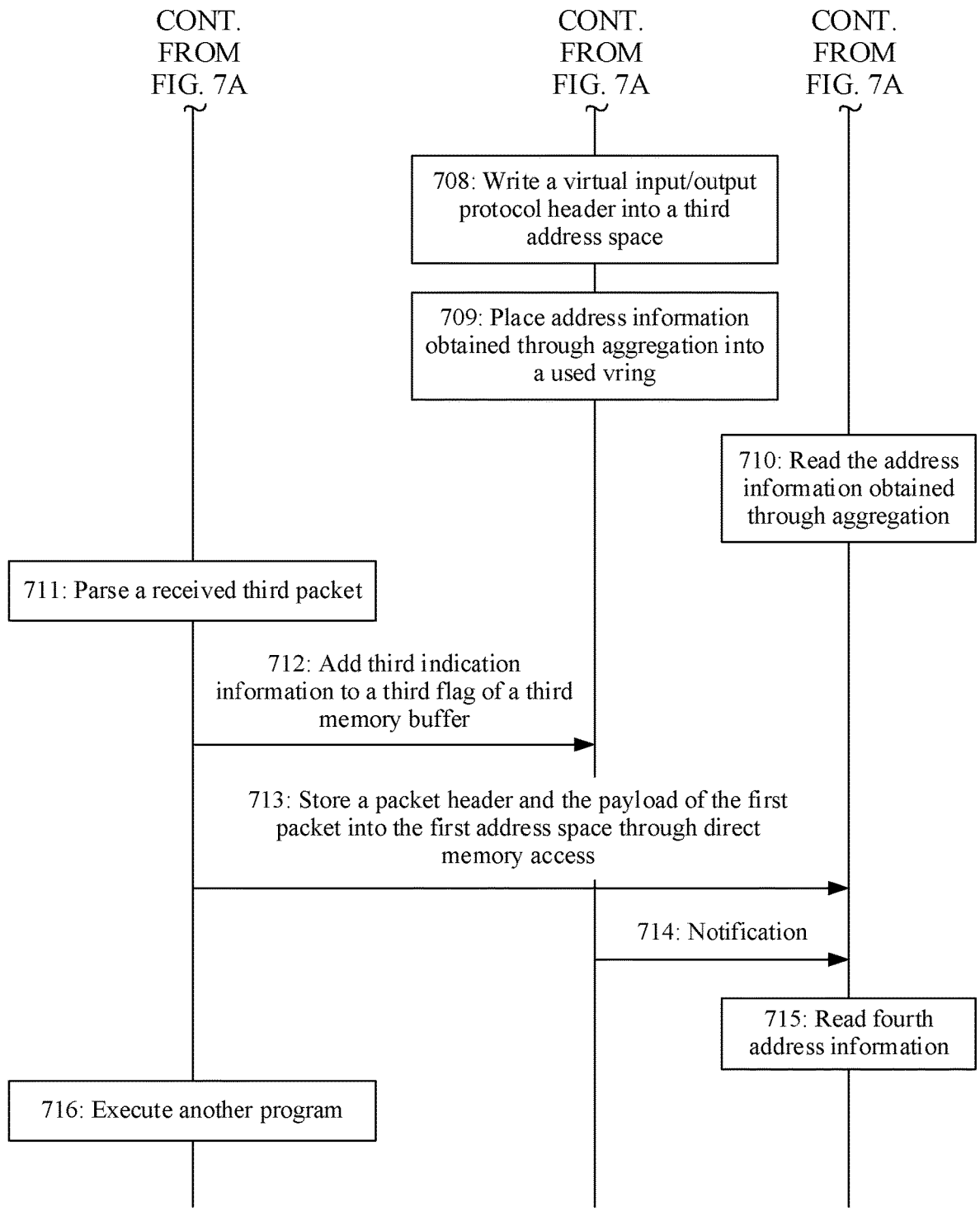

Referring to FIG. 7A and FIG. 7B, in the embodiments of this application, another embodiment of a packet processing method may include the following operations.

In this embodiment, operation 701 is similar to operation 401 in the foregoing embodiment shown in FIG. 4A. Details are not described herein again.

702: The intelligent network interface card determines, based on an identifier of the first packet, whether an aggregation position of the first packet is not an initial position; and if the aggregation position of the first packet is the initial position, performs operation 703, or if the aggregation position of the first packet is the initial position, performs operation 714.

In this embodiment, the intelligent network interface card stores an entry of a reception and aggregation status of the first packet. After obtaining 5-tuple information and a subnet identifier included in the identifier of the first packet in operation 702, the intelligent network interface card may determine a data flow to which the first packet belongs; determine, based on a packet sequence number of the first packet, whether there is a second packet that is sorted before the first packet and that has not been aggregated in at least one second packet belonging to the data flow; and if there is no such a second packet, determine that the aggregation position of the first packet is the initial position, or if there is such a second packet, determine that the aggregation position of the first packet is not the initial position.

In this embodiment, the intelligent network card may store a correspondence table that records reception statuses of first packets belonging to a same data flow, to record reception and aggregation statuses of the first packets. Referring to Table 1, the correspondence table may include a plurality of entries, and each entry corresponds to one data flow. Each entry includes an identifier of a data flow to which a packet belongs and a mapping relationship between a sequence number of the packet and a number of the packet. The number of the packet is used to indicate an aggregation position of the packet. Each of the plurality of entries may further include an identifier of an mbuf linked list, a last update time point of the entry, other information, or the like. Details are not described herein.

In this embodiment, the intelligent network interface card searches the correspondence table for a number of the first packet based on an identifier of the data flow to which the first packet belongs and a sequence number of the first packet; and when the number of the first packet is a preset value, the intelligent network interface card determines that the aggregation position of the first packet is the initial position; or when the number of the first packet is not a preset value, the intelligent network interface card determines that the aggregation position of the first packet is not the initial position.

In this embodiment, after obtaining the identifier of the first packet, the intelligent network interface card obtains, from the identifier of the first packet, the identifier of the data flow to which the first packet belongs, namely, the 5-tuple information and the subnet identifier that are carried in a packet header of the first packet. Because 5-tuple information carried in packet headers of a plurality of second packets belonging to a same data flow is the same, and subnet identifiers carried in the packet headers of the plurality of second packets belonging to the same data flow are the same, the intelligent network interface card may determine, based on the 5-tuple information and the subnet identifier of the first packet, and the correspondence table, a target entry corresponding to the first packet. After determining the target entry that records the data flow, the intelligent network interface card determines the number of the first packet based on the packet sequence number of the first packet and a mapping relationship between the packet sequence number of the first packet and the number of the first packet. When the number of the first packet is the preset value, the intelligent network interface card determines that the aggregation position of the first packet is the initial position; or when the number of the first packet is not the preset value, the intelligent network interface card determines that the aggregation position of the first packet is not the initial position.

In this embodiment and another embodiment, the packet processing method may further include: If the number of the first packet is not the preset value, the intelligent network interface card increases the number of the first packet by 1; and when a number obtained by increasing the number of the first packet by 1 exceeds a first preset threshold, the intelligent network interface card updates the number obtained by increasing the number of the first packet by 1 to the preset value.

In this embodiment, after receiving the first packet, the intelligent network interface card increases the number of the first packet in the correspondence table by 1, and determines whether the number obtained by increasing the number of the first packet by 1 exceeds the first preset threshold; and if the number obtained by increasing the number of the first packet by 1 exceeds the first preset threshold, the intelligent network interface card updates the number obtained by increasing the number of the first packet by 1 to the preset value. In this way, when the intelligent network interface card receives a first packet next time, the intelligent network interface card may learn, based on a second sequence number, that the aggregation position of the first packet is the initial position. This improves implementation flexibility of this solution.

The first preset threshold is a value preset by the intelligent network interface card. The first preset threshold indicates a quantity of a plurality of included second packets on which an aggregation operation is performed each time. In other words, when the quantity of the plurality of second packets belonging to the data flow reaches the first preset value, the plurality of second packets are aggregated. For example, the quantity indicated by the first preset threshold may be 16, 15, 14, or the like. This is not limited herein.

703: The intelligent network interface card adds second indication information to a second flag of a control field of a first mbuf.

In this embodiment, a virtual host maintains the mbuf linked list, and each mbuf linked list includes a plurality of mbufs. After parsing the first packet, the intelligent network interface card may determine the first mbuf corresponding to the first packet, where each mbuf includes a control field and address information. When determining, based on the identifier of the first packet, that the aggregation position of the first packet is not the initial position, the intelligent network interface card adds the second indication information to the second flag of the control field corresponding to the first packet but does not add first indication information to a first flag, and fills a UFID of the first packet in a UFID field of the control field. The second indication information is used to indicate that a sequence number field in the control field is valid.

In this embodiment, as shown in FIG. 5, the control field of the first mbuf includes at least a flag field, a UFID field, and a sequence number field. The flag field further includes a second flag. When the second indication information exists in the second flag, it may indicate that the sequence number field in the control field is valid. For example, the second flag may be FLAG_SEQ, and the second indication information may be 1. For another example, the first flag may be FLAG_SEQ, and the first indication information may be 0. It should be understood that specific representation forms of the second flag and the second indication information are not limited herein, provided that the second indication information identifies that the sequence number field in the control field is valid when the second indication information exists in the second flag.

704. The intelligent network interface card fills in the sequence number field of the control field of the first mbuf.

In this embodiment, after obtaining the identifier of the first packet through parsing, the intelligent network interface card determines, based on the 5-tuple information and the subnet identifier that are included in the identifier of the first packet, the data flow to which the first packet belongs; determines, based on the packet sequence number included in the identifier of the first packet; and fills in the sequence number field of the control field of the first mbuf.

In this embodiment, that the intelligent network interface card fills in the sequence number field of the control field of the first mbuf includes:

the intelligent network interface card writes the number of the first packet into the sequence number field.

In this embodiment, because the intelligent network card may store the correspondence table that records the reception status of the packet of the data flow, there is a target entry corresponding to the first packet in a plurality of entries in the correspondence table, and the target entry includes the number of the first packet, the intelligent network interface card may write the number of the first packet into the sequence number field, to ensure that the intelligent network interface card and the host use same sorting logic for the first packets. This ensures smoothness of packet aggregation and improves efficiency of packet aggregation. A value of the first sequence number may be consistent with a value of the second sequence number.

In this embodiment and another embodiment, the number of the first packet is generated based on a packet sequence number carried in the first packet, and is used to identify the aggregation position of the first packet. When the quantity of the plurality of second packets reaches the first preset threshold, the virtual host notifies the virtual machine to read address information obtained through aggregation, to obtain a larger packet obtained by aggregating the plurality of second packets. Therefore, an absolute number of each first packet in the data flow may be different from a relative number of each first packet in an aggregated queue. In this case, the intelligent network interface card may generate the number of the first packet based on the packet sequence number of the first packet, and write the number of the first packet into the sequence number field of the first mbuf. The sequence number field of the first mbuf is used to notify the host of an aggregation position of the first address information, and is also a position of the first address information relative to the at least one piece of second address information when the host aggregates the first address information with the at least one piece of second address information. For example, four packets belonging to a data flow A that are received by the intelligent network interface card are a1, a2, a3, and a4. A packet sequence number of a1 is 2018071668, a packet sequence number of a2 is 2018071669, a packet sequence number of a3 is 2018071670, and a packet sequence number of a4 is 2018071671. It can be learned from the packet sequence numbers of a1, a2, a3, and a4 that the four packets are sequentially a1, a2, a3, and a4 in the data flow. If the first preset threshold is 16, a number of the first packet a1 may be 4, a number of the first packet a2 may be 5, a number of the first packet a3 may be 6, and a number of the first packet a4 may be 7. It should be understood that, the foregoing examples of the packet sequence number and the number of the first packet are merely used for ease of understanding this solution, and do not constitute any limitation.

705: The intelligent network interface card stores a payload of the first packet into the first address space through DMA.

In this embodiment, after the intelligent network interface card determines the first address space indicated by the first address information, because the aggregation position of the first packet is not the initial position, the intelligent network interface card removes a packet header of the first packet, and stores, through DMA, the payload of the first packet into the first address space indicated by the first address information. The first address space indicated by the first address information is an address space that can be directly accessed by both the virtual host and the virtual machine.

It may be understood that operations 704 and 705 and operation 706 are not sequential in this embodiment, and operations 704 and 705 may be performed before or after operation 706.

706: The main host obtains an mbuf linked list corresponding to the first mbuf.

In this embodiment, the control field of each first mbuf further includes an identifier of the mbuf linked list. Each data flow corresponds to one mbuf linked list. When the aggregation position of the first packet is not the initial position, there is already an mbuf linked list corresponding to the data flow to which the first packet belongs on the main host, the main host determines, based on the identifier of the mbuf linked list carried in the control field of the first mbuf, an mbuf linked list to which the first packet belongs.

707: The main host aggregates the first address information with the at least one piece of second address information.

In this embodiment, after determining the mbuf linked list corresponding to the first mbuf, the main host obtains at least one second mbuf included in the mbuf linked list corresponding to the first mbuf, where the at least one second mbuf includes a header of the mbuf linked list. The main control virtual machine modifies an mbuf pointer of the last second mbuf in the mbuf linked list, to enable the mbuf pointer to point to the first mbuf, so as to aggregate the first mbuf into the mbuf linked list. In this way, it is implemented that the first address information is aggregated with the at least one piece of second address information included in the mbuf linked list.

In this embodiment, operations 708 to 716 are similar to operations 408 to 416 in the foregoing embodiment shown in FIG. 4A and FIG. 4B. Details are not described herein again.

2. The DPDK interface maintains the mbuf linked list.

Figure 8A:
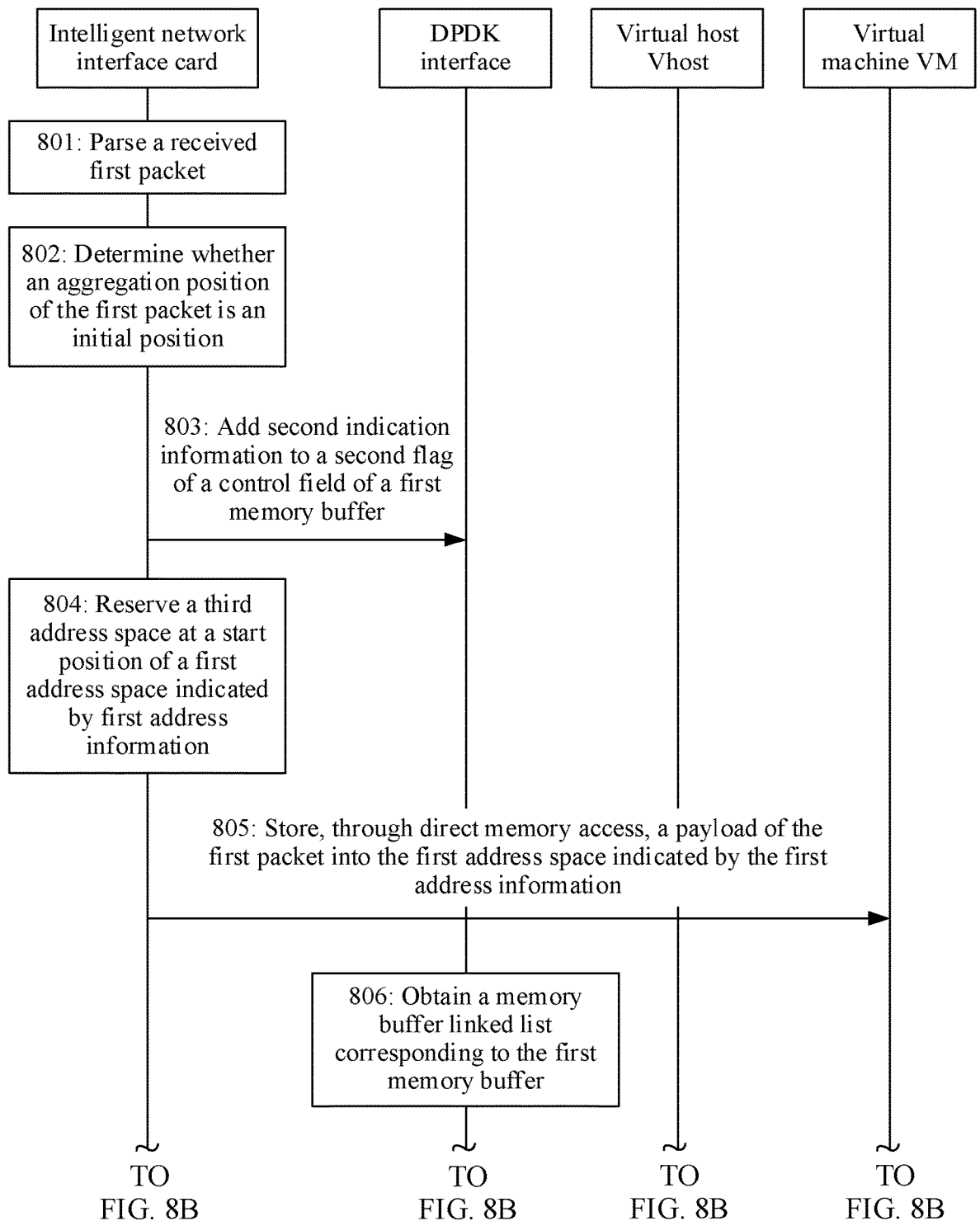
FIG. 8A and FIG. 8B are yet another schematic flowchart of a packet processing method according to an embodiment of this application.
Figure 8B:
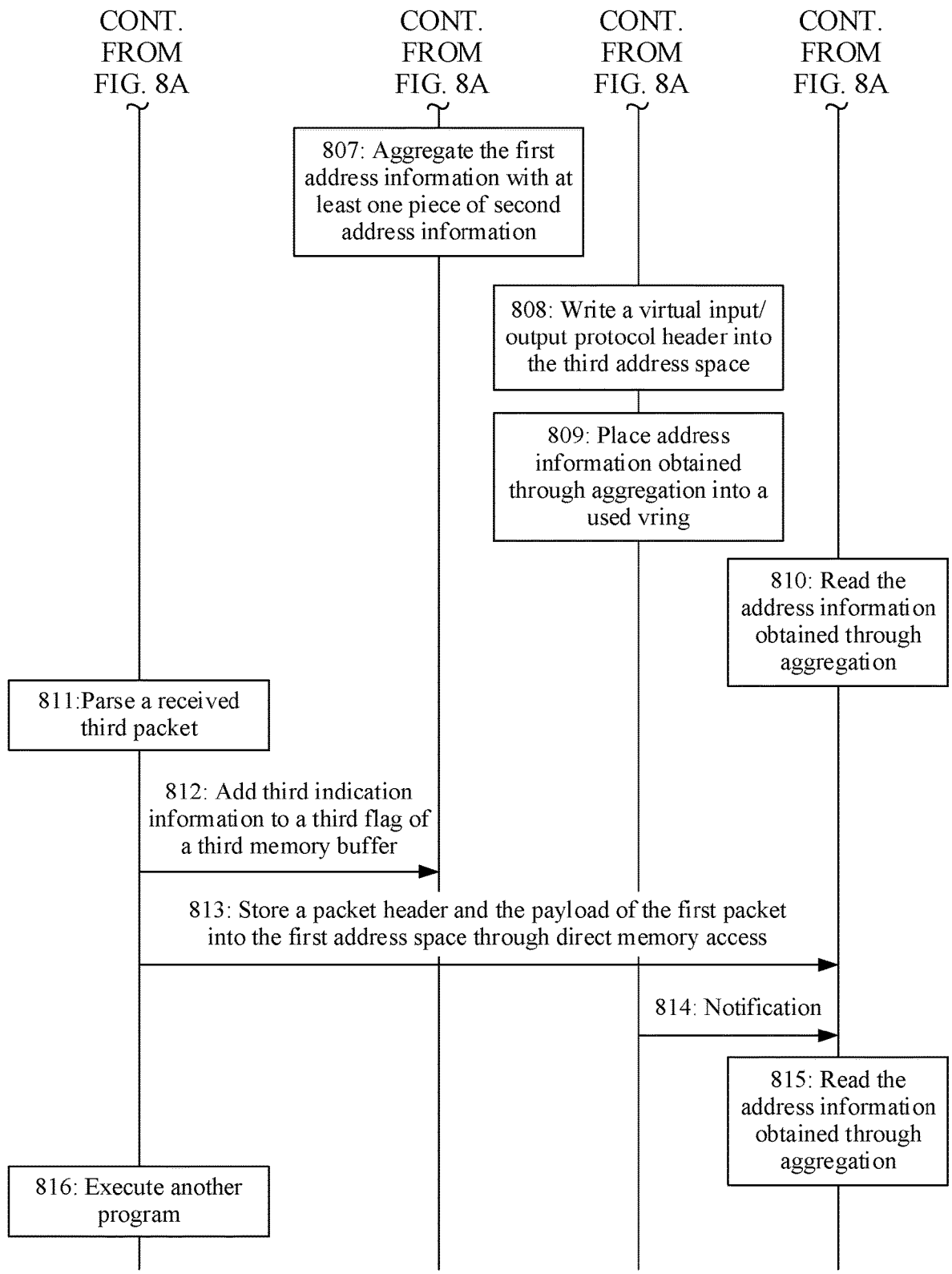

Referring to FIG. 8A and FIG. 8B, in the embodiments of this application, another embodiment of a packet processing method may include the following operations.

In this embodiment, operation 801 is similar to operation 401 in the foregoing embodiment shown in FIG. 4A. Details are not described herein again.

In this embodiment, operation 802 is similar to operation 702 in the foregoing embodiment shown in FIG. 7A. Details are not described herein again.

803: The intelligent network interface card adds second indication information to a second flag of a control field of a first mbuf, where an mbuf linked list to which the first mbuf belongs is maintained by the DPDK interface.

In this embodiment, the DPDK interface maintains the mbuf linked list using a pool mode driver (PMD) process, where the mbuf linked list includes a plurality of mbufs. After parsing the first packet, the intelligent network interface card may determine the first mbuf corresponding to the first packet, where each mbuf includes a control field and address information. When the aggregation position of the first packet is not the initial position, the intelligent network interface card adds the second indication information to the second flag of a control field of the first mbuf corresponding to the first packet, and fills a UFID of the first packet in a UFID field of the control field, where the second indication information is used to indicate that a sequence number field of the first mbuf is valid.

In this embodiment, as shown in FIG. 5, the control field of the first mbuf includes at least a flag field, a UFID field, and a sequence number field. The flag field further includes a second flag. When the second indication information exists in the second flag, it may indicate that the sequence number field in the control field is valid. For example, the second flag may be FLAG_SEQ, and the second indication information may be 1. For another example, the first flag may be FLAG_SEQ, and the first indication information may be 0. It should be understood that specific representation forms of the second flag and the second indication information are not limited herein, provided that the second indication information identifies that the sequence number field in the control field is valid when the second indication information exists in the second flag.

In this embodiment, operations 804 and 805 are similar to operations 704 and 705 in the foregoing embodiment shown in FIG. 7A. Details are not described herein again.

In this embodiment, operations 806 and 807 are similar to operations 706 and 707 in the foregoing embodiment shown in FIG. 7A. Operations 806 and 807 are different from operations 706 and 707 in execution bodies. Operations 406 to 408 are performed by the virtual host, but operations 806 and 807 are performed by the DPDK interface. Details are not described herein again.

In this embodiment, operations 808 to 816 are similar to operations 408 to 416 in the foregoing embodiment shown in FIG. 4A and FIG. 4B. Details are not described herein again.

Figure 9:
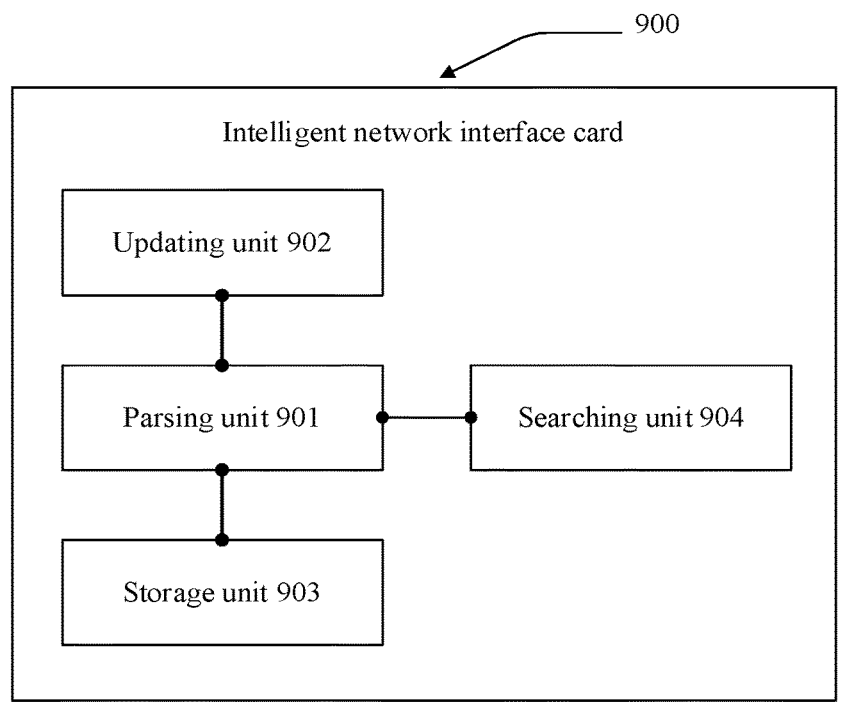
FIG. 9 is a schematic structural diagram of an intelligent network interface card according to an embodiment of this application.

FIG. 9 is a schematic structural diagram of an intelligent network interface card according to an embodiment of this application. The intelligent network interface card runs on a physical machine, and a host and a virtual machine further run on the physical machine. The intelligent network interface card includes:

a parsing unit 901, configured to parse a received first packet to obtain an identifier of the first packet;

an updating unit 902, configured to update a control field of a first memory buffer mbuf based on the identifier of the first packet, where the first mbuf further includes first address information allocated to the first packet, and the first address information indicates a first address space in the virtual machine; and a storage unit 903, configured to store a payload of the first packet or store a packet header and a payload of the first packet into the first address space through DMA based on an aggregation position of the first packet, where the aggregation position is a position of the first address information relative to at least one piece of second address information when the first address information and the at least one piece of second address information are aggregated, the second address information indicates a second address space that is in the virtual machine and that is allocated to a second packet, and the second packet is a packet that is received by the intelligent network interface card and that belongs to a same data flow as the first packet; where an updated control field in the first mbuf is used to indicate the host to aggregate the first address information with the at least one piece of second address information.

In this embodiment, a procedure executed by the elements in the intelligent network interface card is similar to a procedure executed by the intelligent network interface card in the embodiments shown in FIG. 4A and FIG. 4B to FIG. 8A and FIG. 8B. Details are not described herein again.

In this embodiment, the parsing unit parses the received first packet to obtain the identifier of the first packet; the updating unit updates, based on the identifier of the first packet, the control field of the first memory buffer; and the storage unit stores, through DMA, the payload of the first packet or the packet header and the payload of the first packet to the buffer space indicated by the first address information, where the updated control field in the first mbuf may indicate the host to aggregate the first address information with the at least one piece of second address information. In this solution, the intelligent network interface card parses the first packet, so that CPU resources consumed for parsing the first packet are saved. In addition, the intelligent network interface card stores, through DMA, the first packet into the first address space indicated by the first address information, so that the virtual machine can directly read the packet from the first address space. This prevents software from copying the first packet in a mobile manner from an original position to a target position, and saves CPU resources consumed when the software copies the first packet in the mobile manner.

In an embodiment, the control field includes a first flag, and the first flag is used to identify an aggregation position of the first address information;

the updating unit 902 is configured to:

obtain an aggregation position of the first packet based on the identifier of the first packet; and when the aggregation position of the first packet is an initial position, add first indication information to the first flag of the control field; and the storage unit 903 is configured to:

when the aggregation position of the first packet is the initial position, store the packet header and the payload of the first packet into the first address space through DMA.

In an embodiment, the control field includes a second flag and a sequence number field; and the updating unit 902 is configured to: obtain the aggregation position of the first packet based on the identifier of the first packet; when the aggregation position of the first packet is not an initial position, add second indication information to the second flag, where the second indication information is used to indicate that the sequence number field included in the control field is valid; and fill in the sequence number field of the control field, where the sequence number field is used to indicate an aggregation position of the first address information.

In an embodiment, the identifier of the first packet includes an identifier of a data flow to which the first packet belongs and a sequence number of the first packet. The intelligent network interface card stores a correspondence table, and the correspondence table includes a plurality of entries. Each entry includes an identifier of a data flow to which a packet belongs and a mapping relationship between a sequence number of the packet and a number of the packet.

The number of the packet is used to indicate an aggregation position of the packet. The intelligent network interface card further includes:

a searching unit 904, configured to search the correspondence table for a number of the first packet based on the identifier of the data flow to which the first packet belongs and the sequence number of the first packet; and when the number of the first packet is a preset value, determine that the aggregation position of the first packet is the initial position; or when the number of the first packet is not a preset value, determine that the aggregation position of the first packet is not the initial position.

Figure 10:
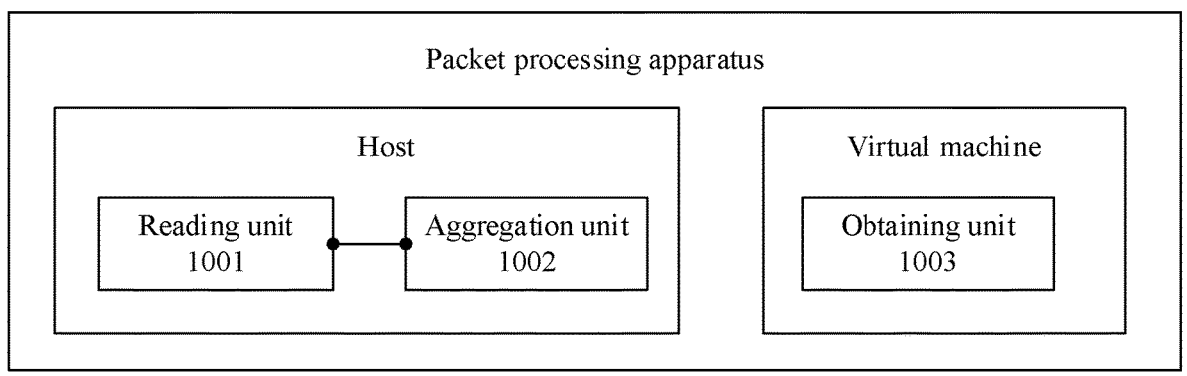
FIG. 10 is a schematic structural diagram of a packet processing apparatus according to this application.

FIG. 10 shows a packet processing apparatus. The apparatus includes a host and a virtual machine. The apparatus runs on a physical machine, and the physical machine further includes an intelligent network interface card.

The host includes:

a reading unit 1001, configured to read a control field of a first mbuf, to determine an aggregation position of a first packet corresponding to the first mbuf, where the control field of the first mbuf is updated by the intelligent network interface card based on an identifier of the first packet; and an aggregation unit 1002, configured to aggregate first address information in the first mbuf with at least one piece of second address information based on the aggregation position of the first packet, where the aggregation position is a position of the first address information relative to at least one piece of second address information when the first address information and the at least one piece of second address information are aggregated, the first address information indicates a first address space that is in the virtual machine and that is allocated to the first packet, the second address information indicates a second address space that is in the virtual machine and that is allocated to a second packet, and the second packet is a packet that belongs to a same data flow as the first packet.

The virtual machine includes:

an obtaining unit 1003, configured to obtain, through DMA based on address information obtained through aggregation, data in an address space indicated by the address information obtained through aggregation, where the data in the address space includes a payload of the first packet and a payload of the at least one second packet.

In this embodiment, a procedure executed by the elements in the host and the virtual machine is similar to a procedure executed by the host and the virtual machine in the embodiments shown in FIG. 4A and FIG. 4B to FIG. 8A and FIG. 8B. Details are not described herein again.

In this embodiment, the host determines the aggregation position of the first packet based on the control field that is in the first mbuf and that is updated by the intelligent network interface card, and aggregates the first address information with the at least one piece of second address information; and then the virtual machine obtains, through DMA based on the address information obtained through aggregation, the data in the address space indicated by the address information obtained through aggregation. In this solution, the host can obtain the aggregation position of the first packet with no need to parse the first packet. In addition, the virtual machine can directly read, through direct memory access, the packet from the address space indicated by the address information obtained through aggregation. This prevents software from copying the first packet in a mobile manner from an original position to a target position, and saves CPU resources consumed when the software copies the first packet in the mobile manner.

In an embodiment, the aggregation position of the first packet is an initial position, and the data in the address space further includes a packet header of the first packet.

In an embodiment, the control field in the first mbuf includes a first flag, and the first flag is used to identify an aggregation position of the first address information; and the reading unit 1001 is configured to: when first indication information exists in the first flag, determine that the aggregation position of the first packet is an initial position.

In an embodiment, the aggregation unit 1002 is configured to place, into a header of an mbuf linked list, the first mbuf that includes the first address information, so that the header of the mbuf linked list is aggregated with at least one second mbuf, where each second mbuf includes the second address information.

In an embodiment the control field in the first mbuf includes a second flag and a sequence number field. The reading unit 1001 is configured to: when second indication information exists in the second flag, determine an aggregation position of the first address information based on the sequence number field, where the second indication information is used to indicate that the sequence number field included in the control field is valid.

An embodiment of this application further provides an intelligent network interface card. The intelligent network interface card includes a processing circuit and a memory. The memory stores a packet processing instruction. The processing circuit is configured to execute the packet processing instruction stored in the memory, to perform the operations performed by the intelligent network interface card in the method described in the embodiment shown in FIG. 3 to FIG. 5.

An embodiment of this application further provides a computer program product including a packet processing instruction. When the computer program product runs on a computer, the computer is enabled to perform the operations performed by the intelligent network interface card in the method described in the embodiment shown in FIG. 3 to FIG. 5.

An embodiment of this application further provides a computer program product including a packet processing instruction. When the computer program product runs on a computer, the computer is enabled to perform the operations performed by the host and the virtual machine in the method described in the embodiment shown in FIG. 3 to FIG. 5.

An embodiment of this application further provides a chip system. The chip system includes a processor, configured to support the packet processing apparatus in implementing functions in the foregoing aspects, for example, sending or processing data and/or information in the foregoing methods. In an embodiment, the chip system further includes a memory, where the memory is configured to store a program instruction and data that are necessary for the packet processing apparatus. The chip system may include a chip, or may include a chip and another discrete component.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the division into units is merely logical functional division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A physical machine, comprising:
    an intelligent network interface card;
    a processor; and
    a memory;
    wherein the processor runs a host and a virtual machine by executing instructions stored in the memory;
    wherein the intelligent network interface card is to
        parse a first packet to obtain an identifier of the first packet,
        update a control field of a first memory buffer (mbuf) based on the identifier of the first packet, wherein the first mbuf further comprises first address information allocated to the first packet, and the first address information indicates a first address space in the virtual machine, wherein the control field comprises a first flag for identifying an aggregation position of the first address information, obtain the aggregation position of the first packet based on the identifier of the first packet, and when the aggregation position of the first packet is an initial position, add first indication information to the first flag of the control field, and store a packet header and a payload of the first packet into the first address space through direct memory access (DMA) based on the aggregation position of the first packet, wherein the aggregation position is a position of the first address information relative to at least one piece of second address information when the first address information and the at least one piece of second address information are aggregated, wherein the at least one piece of second address information indicates a second address space that is in the virtual machine and that is allocated to a second packet, and wherein the second packet is received by the intelligent network interface card and belongs to a same data flow as the first packet;

wherein the host is to generate aggregated address information by aggregating the first address information with the at least one piece of second address information based on an updated control field in the first mbuf; and wherein the virtual machine is to read the aggregated address information to obtain data in an address space indicated by the aggregated address information.

2. The physical machine according to claim 1, wherein the host is to place, into a header of an mbuf linked list, the first mbuf that comprises the first address information, wherein the header of the mbuf linked list is aggregated with at least one second mbuf, wherein each second mbuf comprises the at least one piece of second address information.

3. The physical machine according to claim 1, wherein the first address space comprises a third address space, and the third address space is used to store a virtual input/output virtio protocol header.

4. The physical machine according to claim 1, wherein the identifier of the first packet comprises an identifier of a data flow to which the first packet belongs and a sequence number of the first packet;

wherein the intelligent network interface card is to store a correspondence table which comprises a plurality of entries, each entry comprising an identifier of a data flow to which a packet belongs and a mapping relationship between a sequence number of the packet and a number of the packet, the number of the packet used to indicate an aggregation position of the packet, search the correspondence table for a number of the first packet based on the identifier of the data flow, and determine whether the aggregation position of the first packet is an initial position based on whether the number of the first packet is a preset value.

5. The physical machine according to claim 4, wherein the intelligent network interface card is further to:

when a number obtained by increasing the number of the first packet by 1 is greater than a preset threshold, update the number obtained by increasing the number of the first packet by 1 to the preset value.

6. The physical machine according to claim 1, wherein the intelligent network interface card is further to:

parse a third packet to obtain information carried in the third packet, wherein the information carried in the third packet indicates that the third packet is a packet that does not need to be aggregated, add third indication information to a third flag of a control field of a third mbuf, wherein the third indication information is used to indicate that the third packet needs to be immediately sent, the third mbuf further comprising third address information allocated to the third packet, and the third address information indicating a fourth address space in the virtual machine, and store a packet header and a payload of the third packet into the fourth address space through DMA;

wherein the host is further to send a notification to the virtual machine; and wherein the virtual machine is further to read the third address information based on the notification to obtain the third packet stored in the fourth address space.

7. A packet processing method, applied to an intelligent network interface card on a physical machine with a host and a virtual machine running thereon, wherein the method comprises:

parsing a first packet to obtain an identifier of the first packet;

updating a control field of a first memory buffer (mbuf) based on the identifier of the first packet, wherein the first mbuf further comprises first address information allocated to the first packet, and the first address information indicates a first address space in the virtual machine, wherein the control field comprises a first flag for identifying an aggregation position of the first address information;

obtaining the aggregation position of the first packet based on the identifier of the first packet; and when the aggregation position of the first packet is an initial position, adding first indication information to the first flag of the control field, and storing a packet header and a payload of the first packet into the first address space through direct memory access (DMA) based on the aggregation position of the first packet, wherein the aggregation position is a position of the first address information relative to at least one piece of second address information when the first address information and the at least one piece of second address information are aggregated, the at least one piece of second address information indicates a second address space that is in the virtual machine and that is allocated to a second packet, and the second packet is a packet that is received by the intelligent network interface card and that belongs to a same data flow as the first packet;

wherein an updated control field in the first mbuf is used to indicate the host to aggregate the first address information with the at least one piece of second address information.

8. The packet processing method according to claim 7, wherein the identifier of the first packet comprises an identifier of a data flow to which the first packet belongs and a sequence number of the first packet;

wherein the intelligent network interface card is to store a correspondence table, which comprises a plurality of entries, each entry comprising an identifier of a data flow to which a packet belongs and a mapping relationship between a sequence number of the packet and a number of the packet, the number of the packet used to indicate an aggregation position of the packet, search the correspondence table for a number of the first packet based on the identifier of the data flow, and determine whether the aggregation position of the first packet is the initial position based on whether the number of the first packet is a preset value.

9. A packet processing method, comprising:

reading, by a host running on a physical machine, a control field of a first mbuf to determine an aggregation position of a first packet corresponding to the first mbuf, wherein the control field of the first mbuf comprises a first flag for identifying an aggregation position of first address information, wherein the control field of the first mbuf is updated by an intelligent network interface card based on an identifier of the first packet, the intelligent network interface card comprised in the physical machine, which further comprises a virtual machine running thereon, wherein the reading of the control field of the first mbuf to determine the aggregation position of the first packet corresponding to the first mbuf comprises determining that the aggregation position of the first packet is an initial position when first indication information exists in the first flag;

aggregating, by the host, the first address information in the first mbuf with at least one piece of second address information based on the aggregation position of the first packet, wherein the aggregation position is a position of the first address information relative to at least one piece of second address information when the first address information and the at least one piece of second address information are aggregated, the first address information indicates a first address space that is in the virtual machine and that is allocated to the first packet, wherein the at least one piece of second address information indicates a second address space that is in the virtual machine and that is allocated to a second packet, and wherein the second packet belongs to a same data flow as the first packet; and obtaining, by the virtual machine through direct memory access (DMA) based on address information obtained through aggregation, data in an address space indicated by the address information obtained through aggregation, wherein the data in the address space comprises a payload of the first packet and a payload of the second packet.

10. The packet processing method according to claim 9, wherein the aggregation position of the first packet is an initial position, and the data in the address space further comprises a packet header of the first packet.

11. The packet processing method according to claim 9, wherein the aggregating, by the host, the first address information in the first mbuf with at least one piece of second address information based on the aggregation position of the first packet comprises:

placing, by the host into a header of an mbuf linked list, the first mbuf that comprises the first address information, so that the header of the mbuf linked list is aggregated with at least one second mbuf, wherein each second mbuf comprises the at least one piece of second address information.

12. The packet processing method according to claim 9, wherein the control field in the first mbuf comprises a second flag and a sequence number field; and wherein the reading, by the host, a control field of a first mbuf, to determine an aggregation position of the first packet corresponding to the first mbuf comprises:

when second indication information exists in the second flag, determining, by the host, an aggregation position of the first address information based on the sequence number field, wherein the second indication information is used to indicate that the sequence number field comprised in the control field is valid.

13. An intelligent network interface card, comprising:

a processing circuit; and a memory storing packet processing instructions, which when executed by the processing circuit, cause the processing circuit to perform operations, the operations comprising:

parsing a first packet to obtain an identifier of the first packet, updating a control field of a first memory buffer (mbuf) based on the identifier of the first packet, wherein the first mbuf further comprises first address information allocated to the first packet, and the first address information indicates a first address space in a virtual machine, wherein the control field comprises a first flag for identifying an aggregation position of the first address information, obtaining the aggregation position of the first packet based on the identifier of the first packet, when the aggregation position of the first packet is an initial position, adding first indication information to the first flag of the control field and storing a packet header and a payload of the first packet into the first address space through direct memory access (DMA) based on the aggregation position of the first packet, wherein the aggregation position is a position of the first address information relative to at least one piece of second address information when the first address information and the at least one piece of second address information are aggregated, wherein the at least one piece of second address information indicates a second address space that is in the virtual machine and that is allocated to a second packet, and wherein the second packet is received by the intelligent network interface card and belongs to a same data flow as the first packet;

wherein an updated control field in the first mbuf is used to indicate a host to aggregate the first address information with the at least one piece of second address information.

* * * * *